United States Patent
Ren et al.

(10) Patent No.: US 12,021,603 B2
(45) Date of Patent: Jun. 25, 2024

(54) TIME DELAY COMPENSATION METHOD AND APPARATUS AND TIME DELAY CONTROL METHOD AND APPARATUS

(71) Applicant: DATANG MOBILE COMMUNICATIONS EQUIPMENT CO., LTD., Beijing (CN)

(72) Inventors: Bin Ren, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 337 days.

(21) Appl. No.: 17/601,715

(22) PCT Filed: Mar. 13, 2020

(86) PCT No.: PCT/CN2020/079367
§ 371 (c)(1),
(2) Date: Oct. 6, 2021

(87) PCT Pub. No.: WO2020/207195
PCT Pub. Date: Oct. 15, 2020

(65) Prior Publication Data
US 2022/0200695 A1 Jun. 23, 2022

(30) Foreign Application Priority Data

Apr. 8, 2019 (CN) .......................... 201910276547.7
Apr. 30, 2019 (CN) .......................... 201910360856.2

(51) Int. Cl.
*H04B 7/185* (2006.01)
*H04W 56/00* (2009.01)

(52) U.S. Cl.
CPC ..... *H04B 7/18519* (2013.01); *H04B 7/18513* (2013.01); *H04W 56/004* (2013.01)

(58) Field of Classification Search
CPC .............. H04W 84/06; H04W 56/004; H04W 56/0005; H04B 7/18513; H04B 7/18515;
(Continued)

(56) References Cited

U.S. PATENT DOCUMENTS

2018/0083694 A1 3/2018 Rajagopalan et al.

FOREIGN PATENT DOCUMENTS

| CN | 102231908 A | 11/2011 |
| CN | 103220773 A | 7/2013 |

(Continued)

OTHER PUBLICATIONS

MediaTek Inc., "Timing Advance and RACH in NR-NTN Document for: Discussion and Decision", 3GPP TSG RAN WG1 Meeting #96bis, Xi'an, China, Apr. 8-Apr. 12, 2019, total 5 pages, R1-1904645.

(Continued)

*Primary Examiner* — Khalid W Shaheed
(74) *Attorney, Agent, or Firm* — Kilpatrick Townsend & Stockton LLP

(57) ABSTRACT

Disclosed are a time delay compensation method and apparatus and a time delay control method and apparatus, which are used for performing time delay compensation on the basis of a relative time delay of a service link and a relative time delay of a feeder link. An uplink timing mechanism for an NTN system is provided, to ensure the reliability of a synchronization establishment process of the NTN system and the timing accuracy of a subsequent data transmission process. Provided is a time delay compensation method, comprising: determining that time delay compensation needs to be performed on a service link and a feeder link in a non-terrestrial networks (NTN) system; and performing
(Continued)

time delay compensation on the basis of a relative time delay of the service link and a relative time delay of the feeder link.

17 Claims, 7 Drawing Sheets

(58) Field of Classification Search
CPC .......................... H04B 7/2041; H04B 7/1851; H04B 7/18523; H04B 7/2125; H04B 7/1853

See application file for complete search history.

(56) References Cited

FOREIGN PATENT DOCUMENTS

| | | |
|---|---|---|
| CN | 107528628 A | 12/2017 |
| WO | 2019063108 A1 | 4/2019 |

OTHER PUBLICATIONS

Thales et al., "CB: # 69_NTNarch_regenerative", 3GPP TSG RAN WG3 Meeting #102, Spokane/USA, Nov. 12-16, 2018, total 9 pages, R3-187193.

Thales, "On Timing Advance in NTN", 3GPP TSG RAN WG1 Meeting #96bis, Xi'an/China, Apr. 7-13, 2019, total 15 pages, R1-1905180.

DISH Network, "On Timing Advance for NTN", 3GPP TSG RAN WG1 Meeting #96Bis, Xian, China, Apr. 8-12, 2019, total 3 pages, R1-1905215.

ZTE Corporation et al., "Consideration on Random Access for NTN", 3GPP TSG-RAN WG2 #105 Meeting, Athens, Greece, Feb. 25-Mar. 1, 2019, total 8 pages, R2-1900576.

Spreadtrum Communications, "Asymmetric UL and DL frame timing at gNB side", 3GPP TSG-RAN WG2 Meeting #105bis, Xi'an, China, Apr. 8-12, 2019, total 4 pages, R2-1903798.

TIME DELAY COMPENSATION METHOD AND APPARATUS AND TIME DELAY CONTROL METHOD AND APPARATUS

CROSS-REFERENCE OF RELATED APPLICATIONS

The present application is a national phase entry under 35 U.S.C. § 371 of International Application No. PCT/CN2020/079367, filed on Mar. 13, 2020, which claims the priority from Chinese Patent Application No. 201910276547.7, filed with China National Intellectual Property Administration on Apr. 8, 2019 and entitled "TIME DELAY COMPENSATION METHOD AND APPARATUS AND TIME DELAY CONTROL METHOD AND APPARATUS", of which the entire content is incorporated by reference in the present application; and the present application claims the priority from Chinese Patent Application No. 201910360856.2, filed with China National Intellectual Property Administration on Apr. 30, 2019 and entitled "TIME DELAY COMPENSATION METHOD AND APPARATUS AND TIME DELAY CONTROL METHOD AND APPARATUS", of which the entire content is incorporated by reference in the present application.

FIELD

The present application relates to the field of communication technology, and in particular to method and apparatus for time delay compensation, and method and apparatus for control of time delay compensation.

BACKGROUND

The satellite communication system (Non-Terrestrial Networks, NTN) is provided with a cell radius much larger than that for conventional cellular communication systems, thus has introduced extremely large propagation time delays, which affects the uplink timing mechanism in the random access process and the subsequent data transmission process.

Referring to FIG. 1, for a specific downlink beam covering a cell in a satellite communication system, there are two links: a user link and a feeder link, and the service link (service link) refers to a link connection between a mobile terminal and a satellite; and the feeder link refers to a link connection between a satellite and a gateway (or gateway station). As shown in FIG. 1, there are two types of random access synchronization time delays in the NTN system: the first part is the absolute time delay T1 of the service link; and the second part is the absolute time delay T2 of the feeder link. The sum of the two time delays (T1+T2) in FIG. 1, depends on the vertical height of the satellite and the horizontal distances from the satellite to a user equipment (UE) and the gateway, and the typical value of which is more than 20 ms.

The CP lengths of the Physical Random Access CHannel (PRACH), Physical Uplink Shared CHannel (PUSCH), Physical Uplink Control CHannel (PUCCH) and Sounding Reference Signal (SRS) in the New Radio (NR) system are introduced as follows.

The PRACH preamble defined by the 5G NR protocol consists of a Cyclic Prefix (CP) and one or more Preamble sequences, and each Preamble sequence occupies a PRACH Orthogonal Frequency Division Multiplexing (OFDM) symbol. The Guard Time (GT) is not explicitly defined in the protocol, instead, it is implicitly expressed in the PRACH Preamble format by aligning the slot in which the PRACH Preamble is located with other slots.

The following Table 1 and Table 2 respectively give the PRACH CP lengths corresponding to the long PRACH preamble and the short PRACH preamble supported by the 5G NR. It can be seen from Table 1 and Table 2 that the maximum PRACH CP length is 0.684 ms.

TABLE 1

PRACH CP length corresponding to long PRACH preamble

| | PRACH CP length | | | |
|---|---|---|---|---|
| PRACH preamble format | 0 | 1 | 2 | 3 |
| CP length T_CP [ms] | 0.103 | 0.684 | 0.153 | 0.103 |
| Total length of Preamble T_SEQ [ms] | 0.8 | 1.603 | 3.2 | 0.8 |
| GT length T_GT [ms] | 0.097 | 0.713 | 0.147 | 0.097 |

TABLE 2

PRACH CP length corresponding to short PRACH preamble

| | PRACH CP length PRACH preamble format | | | | | | | | |
|---|---|---|---|---|---|---|---|---|---|
| | A1 | A2 | A3 | B1 | B2 | B3 | B4 | C0 | C2 |
| CP length T_CP [us] | 9.375 | 18.75 | 28.125 | 7.031 | 11.719 | 16.406 | 30.469 | 40.36 | 66.67 |
| GT length T_GT [us] | 0 | 0 | 0 | 2.344 | 7.031 | 11.719 | 25.781 | 35.677 | 94.922 |

For the PUSCH, PUCCH and SRS, when the subcarrier spacing is SCS=15 KHz, the regular CP length is 144Ts=4.69us, and 1Ts=1/30.72e6 s; and the extended CP length is 512Ts=16.67us.

To sum up, the absolute time delay compensation method usually adopted in terrestrial cellular communication systems is not applicable in satellite communication systems. Since the values of T1 and T2 in the NTN system are relatively large, the overhead of the CP and GT may be too large and the UE hardware implementation complexity may be high if the compensation scheme of absolute time delays T1 and T2 is adopted.

SUMMARY

The embodiments of the present application provide time delay compensation method and apparatus, and time delay compensation control method and apparatus, to perform the time delay compensation based on the relative time delay of the service link and the relative time delay of the feeder link, provide an uplink timing mechanism of the NTN system, and ensure the reliability of the synchronization establishment process of the NTN system and the timing accuracy of the subsequent data transmission process.

On the terminal side, a time delay compensation method provided by embodiments of the present application includes:

determining that time delay compensation needs to be performed on a service link and a feeder link in a satellite communication system NTN;

performing time delay compensation based on a relative time delay of the service link and a relative time delay of the feeder link.

The embodiment of the present application performs the time delay compensation based on the relative time delay of the service link and the relative time delay of the feeder link, provides an uplink timing mechanism of the NTN system, and ensures the reliability of the synchronization establishment process of the NTN system and the timing accuracy of the subsequent data transmission process.

In one embodiment, the method further includes: reporting the relative time delay of the service link and the relative time delay of the feeder link to a network side.

In one embodiment, the relative time delay of the service link is determined according to a reference distance or a reference time delay of the service link.

In one embodiment, the relative time delay of the service link is determined by a following formula:

$$T3=(d3-d3\_ref)/c=t3-t3\_ref$$

and T3 represents the relative time delay of the service link; c represents a speed of light; d3 represents an absolute distance of the service link; $t3=d3/c$, and t3 represents an absolute time delay of the service link; $d3\_ref$ represents the reference distance of the service link; $t3\_ref=d3\_ref/c$, and $t3\_ref$ represents the reference time delay of the service link.

In one embodiment, the reference distance $d3\_ref$ or the reference time delay $t3\_ref$ of the service link is obtained by using one of four following methods:

first method: the reference distance $d3\_ref$ or the reference time delay $t3\_ref$ of the service link is predefined as a fixed value, by a protocol;

second method: obtaining the reference distance $d3\_ref$ or the reference time delay $t3\_ref$ of the service link through broadcast signaling or other downlink signaling issued by a network side;

third method: the reference distance $d3\_ref$ or the reference time delay $t3\_ref$ of the service link is predefined as a value associated with latitude, by a protocol;

fourth method: obtaining the reference distance $d3\_ref$ or the reference time delay $t3\_ref$ of the service link according to ephemeris information, and the ephemeris information contains information used by the terminal to determine a precise location of a satellite.

In one embodiment, when the second method is used, the reference distance $d3\_ref$ is a shortest distance from the satellite to a ground cell, or the reference distance $d3\_ref$ is the shortest distance from the satellite to the ground cell minus a distance offset value related to height, or the reference time delay $t3\_ref$ is a shortest time delay for the satellite to reach the ground cell, or the reference time delay $t3\_ref$ is the shortest time delay for the satellite to reach the ground cell minus a time delay offset value related to height.

In one embodiment, when the fourth method is used, a shortest distance from the satellite to a ground cell where the terminal is located is obtained according to the ephemeris information, and the shortest distance is used as the reference distance $d3\_ref$; or a shortest time delay for the satellite to reach the ground cell where the terminal is located is obtained according to the ephemeris information, and the shortest time delay is used as the reference time delay $t3\_ref$.

In one embodiment, the relative time delay of the feeder link is determined according to a reference distance or a reference time delay of the feeder link.

In one embodiment, the relative time delay of the feeder link is determined by a following formula:

$$T4=(d4-d4\_ref)/c=t4-t4\_ref$$

and T4 represents the relative time delay of the feeder link; c represents a speed of light; d4 represents an absolute distance of the feeder link; $t4=d4/c$, and t4 represents an absolute time delay of the feeder link; $d4\_ref$ represents the reference distance of the feeder link; $t4\_ref=d4\_ref/c$, and $t4\_ref$ represents the reference time delay of the feeder link.

In one embodiment, the reference distance $d4\_ref$ or the reference time delay $t4\_ref$ of the feeder link is obtained by using one of three following methods:

first method: obtaining an actual location of a gateway station through broadcast signaling or other downlink signaling issued by a network side, and determining the reference distance $d4\_ref$ of the feeder link or the reference time delay $t4\_ref$ of the feeder link according to the actual location of the gateway station;

second method: obtaining the reference distance $d4\_ref$ of the feeder link or the reference time delay $t4\_ref$ of the feeder link through broadcast signaling or other downlink signaling issued by the network side;

third method: the reference distance $d4\_ref$ of the feeder link or the reference time delay $t4\_ref$ of the feeder link is predefined as a value associated with latitude, by a protocol.

In one embodiment, when the first method is used:

a minimum of absolute distances for feeder links of multiple satellites associated with the gateway station is used as the reference distance $d4\_ref$ of the feeder link according to the actual location of the gateway station; or a minimum of absolute time delays for feeder links of multiple satellites associated with the gateway station is used as the reference time delay $t4\_ref$ of the feeder link according to the actual location of the gateway station;

or the reference distance $d4\_ref$ of the feeder link or the reference time delay $t4\_ref$ of the feeder link is determined through the actual location of the gateway station and ephemeris information of a target satellite.

In one embodiment, the performing time delay compensation based on a relative time delay of the service link and a relative time delay of the feeder link, specifically includes:

calculating a total relative time delay compensation value T_total by a following formula:

$$T\_total=T3+T4+T\_offset$$

and T3 represents the relative time delay of the service link, T4 represents the relative time delay of the feeder link, and T_offset represents a preset offset;

performing time delay compensation on a transmitting end signal based on the total relative time delay compensation value.

In one embodiment, the performing time delay compensation based on a relative time delay of the service link and a relative time delay of the feeder link, specifically includes:

obtaining a parameter T_ref_total notified by a network side, and T_ref_total=$t3\_ref+t4\_ref$-T_offset, $t3\_ref$ represents a reference time delay of the service link, $t4\_ref$ represents a reference time delay of the feeder link, and T_offset represents a preset offset;

determining a total relative time delay compensation value T_total by using T_ref_total, and T_total=t3+t4−T_ref_total;

performing time delay compensation on a transmitting end signal based on the total relative time delay compensation value.

Correspondingly, on the network side, a time delay compensation control method provided by embodiments of the present application includes:

determining control parameters for instructing a terminal to perform time delay compensation based on a relative time delay of a service link and a relative time delay of a feeder link in a satellite communication system NTN;

notifying the terminal of the control parameters.

In one embodiment, the control parameters include a parameter for instructing the terminal to determine the relative time delay of the service link: a reference distance d3_ref or a reference time delay t3_ref of the service link;

the control parameters further include a parameter for instructing the terminal to determine the relative time delay of the feeder link: a reference distance d4_ref or a reference time delay t4_ref of the feeder link.

In one embodiment, notifying the terminal of the parameter for instructing the terminal to determine the relative time delay of the service link specifically includes: issuing broadcast signaling or other downlink signaling so that the terminal obtains the reference distance d3_ref or the reference time delay t3_ref of the service link.

In one embodiment, notifying the terminal of the parameter for instructing the terminal to determine the relative time delay of the feeder link specifically includes:

issuing broadcast signaling or other downlink signaling to assist the terminal in obtaining an actual location of a gateway station, so that the terminal determines the reference distance d4_ref of the feeder link or the reference time delay t4_ref of the feeder link according to the actual location of the gateway station;

or issuing broadcast signaling or other downlink signaling so that the terminal obtains the reference distance d4_ref of the feeder link or the reference time delay t4_ref of the feeder link.

In one embodiment, when notifying the reference distance d3_ref or reference time delay t3_ref of the service link through broadcast signaling or notifying the reference distance d4_ref of the feeder link or the reference time delay t4_ref of the feeder link through broadcast signaling, the method further include: notifying a starting time from which the reference distance or reference time delay becomes effective.

In one embodiment, the control parameters further comprise a preset offset T_offset, to allow the terminal to determine a total relative time delay compensation value T_total based on the relative time delay of the service link, the relative time delay of the feeder link and the offset T_offset, and perform time delay compensation on a transmitting end signal based on T_total.

In one embodiment, the control parameters include T_ref_total, to allow the terminal to determine a total relative time delay compensation value T_total based on T_ref_total, an absolute time delay of the service link and an absolute time delay of the feeder link, and perform time delay compensation on a transmitting end signal based on T_total;

and T_ref_total=t3_ref+t4_ref-T_offset, t3_ref represents the reference time delay of the service link, t4_ref represents the reference time delay of the feeder link, T_offset represents a preset offset; and T_total=t3+t4−T_ref_total.

In one embodiment, the method further includes:

obtaining the relative time delay of the service link and the relative time delay of the feeder link reported by the terminal.

On the terminal side, a time delay compensation apparatus provided by embodiments of the present application includes:

a memory configured to store program instructions;

a processor configured to invoke the program instructions stored in the memory, and execute according to an obtained program:

determining that time delay compensation needs to be performed on a service link and a feeder link in a satellite communication system NTN;

performing time delay compensation based on a relative time delay of the service link and a relative time delay of the feeder link.

In one embodiment, the processor is further configured to:

report the relative time delay of the service link and the relative time delay of the feeder link to a network side.

In one embodiment, the relative time delay of the service link is determined according to a reference distance or a reference time delay of the service link.

In one embodiment, the relative time delay of the service link is determined by a following formula:

$$T3=(d3-d3\_ref)/c=t3-t3\_ref$$

and T3 represents the relative time delay of the service link; c represents a speed of light; d3 represents an absolute distance of the service link; t3=d3/c, and t3 represents an absolute time delay of the service link; d3_ref represents the reference distance of the service link; t3_ref=d3_ref/c, and t3_ref represents the reference time delay of the service link.

In one embodiment, the reference distance d3_ref or the reference time delay t3_ref of the service link is obtained by using one of four following methods:

first method: the reference distance d3_ref or the reference time delay t3_ref of the service link is predefined as a fixed value, by a protocol;

second method: obtaining the reference distance d3_ref or the reference time delay t3_ref of the service link through broadcast signaling or other downlink signaling issued by a network side;

third method: the reference distance d3_ref or the reference time delay t3_ref of the service link is predefined as a value associated with latitude, by a protocol;

fourth method: obtaining the reference distance d3_ref or the reference time delay t3_ref of the service link according to ephemeris information, and the ephemeris information contains information used by the terminal to determine a precise location of a satellite.

In one embodiment, when the second method is used, the reference distance d3_ref is a shortest distance from the satellite to a ground cell, or the reference distance d3_ref is the shortest distance from the satellite to the ground cell minus a distance offset value related to height, or the reference time delay t3_ref is a shortest time delay for the satellite to reach the ground cell, or the reference time delay t3_ref is the shortest time delay for the satellite to reach the ground cell minus a time delay offset value related to height.

In one embodiment, when the fourth method is used, a shortest distance from the satellite to a ground cell where the terminal is located is obtained according to the ephemeris information, and the shortest distance is used as the reference distance d3_ref; or a shortest time delay for the satellite to reach the ground cell where the terminal is located is obtained according to the ephemeris information, and the shortest time delay is used as the reference time delay t3_ref.

In one embodiment, the relative time delay of the feeder link is determined according to a reference distance or a reference time delay of the feeder link.

In one embodiment, the relative time delay of the feeder link is determined by a following formula:

$$T4=(d4-d4\_ref)/c=t4-t4\_ref$$

and T4 represents the relative time delay of the feeder link; c represents a speed of light; d4 represents an absolute distance of the feeder link; $t4=d4/c$, and t4 represents an absolute time delay of the feeder link; d4_ref represents the reference distance of the feeder link; $t4\_ref=d4\_ref/c$, and t4_ref represents the reference time delay of the feeder link.

In one embodiment, the reference distance d4_ref or the reference time delay t4_ref of the feeder link is obtained by using one of three following methods:

first method: obtaining an actual location of a gateway station through broadcast signaling or other downlink signaling issued by a network side, and determining the reference distance d4_ref of the feeder link or the reference time delay t4_ref of the feeder link according to the actual location of the gateway station;

second method: obtaining the reference distance d4_ref of the feeder link or the reference time delay t4_ref of the feeder link through broadcast signaling or other downlink signaling issued by the network side;

third method: the reference distance d4_ref of the feeder link or the reference time delay t4_ref of the feeder link is predefined as a value associated with latitude, by a protocol.

In one embodiment, when the first method is used:

a minimum of absolute distances for feeder links of multiple satellites associated with the gateway station is used as the reference distance d4_ref of the feeder link according to the actual location of the gateway station; or a minimum of absolute time delays for feeder links of multiple satellites associated with the gateway station is used as the reference time delay t4_ref of the feeder link according to the actual location of the gateway station; or the reference distance d4_ref of the feeder link or the reference time delay t4_ref of the feeder link is determined through the actual location of the gateway station and ephemeris information of a target satellite.

In one embodiment, the processor is specifically configured to:

calculate a total relative time delay compensation value T_total by a following formula:

$$T\_total=T3+T4+T\_offset$$

and T3 represents the relative time delay of the service link, T4 represents the relative time delay of the feeder link, and T_offset represents a preset offset;

perform time delay compensation on a transmitting end signal based on the total relative time delay compensation value.

In one embodiment, the processor is specifically configured to:

obtain a parameter T_ref_total notified by a network side, and T_ref_total=t3_ref+t4_ref-T_offset, t3_ref represents a reference time delay of the service link, t4_ref represents a reference time delay of the feeder link, and T_offset represents a preset offset;

determine a total relative time delay compensation value T_total by using T_ref_total, and T_total=t3+t4−T_ref_total;

perform time delay compensation on a transmitting end signal based on the total relative time delay compensation value.

On the network side, a time delay compensation control apparatus provided by embodiments of the present application includes:

a memory configured to store program instructions;

a processor configured to invoke the program instructions stored in the memory, and execute according to an obtained program:

determining control parameters for instructing a terminal to perform time delay compensation based on a relative time delay of a service link and a relative time delay of a feeder link in a satellite communication system NTN;

notifying the terminal of the control parameters.

In one embodiment, the control parameters include a parameter for instructing the terminal to determine the relative time delay of the service link: a reference distance d3_ref or a reference time delay t3_ref of the service link;

the control parameters further include a parameter for instructing the terminal to determine the relative time delay of the feeder link: a reference distance d4_ref or a reference time delay t4_ref of the feeder link.

In one embodiment, notifying the terminal of the parameter for instructing the terminal to determine the relative time delay of the service link specifically includes: issuing broadcast signaling or other downlink signaling so that the terminal obtains the reference distance d3_ref or the reference time delay t3_ref of the service link.

In one embodiment, the processor is specifically configured to:

issue broadcast signaling or other downlink signaling to assist the terminal in obtaining an actual location of a gateway station, to allow the terminal to determine the reference distance d4_ref of the feeder link or the reference time delay t4_ref of the feeder link according to the actual location of the gateway station;

or issue broadcast signaling or other downlink signaling so that the terminal obtains the reference distance d4_ref of the feeder link or the reference time delay t4_ref of the feeder link.

In one embodiment, when the processor notifies the reference distance d3_ref or reference time delay t3_ref of the service link through broadcast signaling or notifies the reference distance d4_ref of the feeder link or the reference time delay t4_ref of the feeder link through broadcast signaling, the processor is further configured to notify a starting time from which the reference distance or reference time delay becomes effective.

In one embodiment, the control parameters further include a preset offset T_offset, to allow the terminal to determine a total relative time delay compensation value T_total based on the relative time delay of the service link, the relative time delay of the feeder link and the offset T_offset, and perform time delay compensation on a transmitting end signal based on T_total.

In one embodiment, the control parameters include T_ref_total, so that the terminal determines a total relative time delay compensation value T_total based on T_ref_total, an absolute time delay of the service link and an absolute time delay of the feeder link, and performs time delay compensation on a transmitting end signal based on T_total;

and T_ref_total=t3_ref+t4_ref-T_offset, t3_ref represents the reference time delay of the service link, t4_ref represents the reference time delay of the feeder link, T_offset represents a preset offset; and T_total=t3+t4−T_ref_total.

In one embodiment, the processor is further configured to:

obtain the relative time delay of the service link and the relative time delay of the feeder link reported by the terminal.

On the terminal side, another time delay compensation apparatus provided by embodiments of the present application includes:

a determining device configured to determine that time delay compensation needs to be performed on a service link and a feeder link in a satellite communication system NTM;

a compensation device configured to perform time delay compensation based on a relative time delay of the service link and a relative time delay of the feeder link.

In one embodiment, the determining device is further configured to:

report the relative time delay of the service link and the relative time delay of the feeder link to a network side.

In one embodiment, the relative time delay of the service link is determined according to a reference distance or a reference time delay of the service link.

In one embodiment, the relative time delay of the service link is determined by a following formula:

$$T3=(d3-d3\_ref)/c=t3-t3\_ref$$

and T3 represents the relative time delay of the service link; c represents a speed of light; d3 represents an absolute distance of the service link; t3=d3/c, and t3 represents an absolute time delay of the service link; d3_ref represents the reference distance of the service link; t3_ref=d3_ref/c, and t3_ref represents the reference time delay of the service link.

In one embodiment, the reference distance d3_ref or the reference time delay t3_ref of the service link is obtained by using one of four following methods:

first method: the reference distance d3_ref or the reference time delay t3_ref of the service link is predefined as a fixed value, by a protocol;

second method: obtaining the reference distance d3_ref or the reference time delay t3_ref of the service link through broadcast signaling or other downlink signaling issued by a network side;

third method: the reference distance d3_ref or the reference time delay t3_ref of the service link is predefined as a value associated with latitude, by a protocol;

fourth method: obtaining the reference distance d3_ref or the reference time delay t3_ref of the service link according to ephemeris information, and the ephemeris information contains information used by the terminal to determine a precise location of a satellite.

In one embodiment, when the second method is used, the reference distance d3_ref is a shortest distance from the satellite to a ground cell, or the reference distance d3_ref is the shortest distance from the satellite to the ground cell minus a distance offset value related to height, or the reference time delay t3_ref is a shortest time delay for the satellite to reach the ground cell, or the reference time delay t3_ref is the shortest time delay for the satellite to reach the ground cell minus a time delay offset value related to height.

In one embodiment, when the fourth method is used, a shortest distance from the satellite to a ground cell where the terminal is located is obtained according to the ephemeris information, and the shortest distance is used as the reference distance d3_ref; or a shortest time delay for the satellite to reach the ground cell where the terminal is located is obtained according to the ephemeris information, and the shortest time delay is used as the reference time delay t3_ref.

In one embodiment, the relative time delay of the feeder link is determined according to a reference distance or a reference time delay of the feeder link.

In one embodiment, the relative time delay of the feeder link is determined by a following formula:

$$T4=(d4-d4\_ref)/c=t4-t4\_ref$$

and T4 represents the relative time delay of the feeder link; c represents a speed of light; d4 represents an absolute distance of the feeder link; t4=d4/c, and t4 represents an absolute time delay of the feeder link; d4_ref represents the reference distance of the feeder link; t4_ref=d4_ref/c, and t4_ref represents the reference time delay of the feeder link.

In one embodiment, the reference distance d4_ref or the reference time delay t4_ref of the feeder link is obtained by using one of three following methods:

first method: obtaining an actual location of a gateway station through broadcast signaling or other downlink signaling issued by a network side, and determining the reference distance d4_ref of the feeder link or the reference time delay t4_ref of the feeder link according to the actual location of the gateway station;

second method: obtaining the reference distance d4_ref of the feeder link or the reference time delay t4_ref of the feeder link through broadcast signaling or other downlink signaling issued by the network side;

third method: the reference distance d4_ref of the feeder link or the reference time delay t4_ref of the feeder link is predefined as a value associated with latitude, by a protocol.

In one embodiment, when the first method is used:

a minimum of absolute distances for feeder links of multiple satellites associated with the gateway station is used as the reference distance d4_ref of the feeder link according to the actual location of the gateway station; or a minimum of absolute time delays for feeder links of multiple satellites associated with the gateway station is used as the reference time delay t4_ref of the feeder link according to the actual location of the gateway station; or the reference distance d4_ref of the feeder link or the reference time delay t4_ref of the feeder link is determined through the actual location of the gateway station and ephemeris information of a target satellite.

In one embodiment, the compensation device is specifically configured to:

calculate a total relative time delay compensation value T_total by a following formula:

$$T\_total=T3+T4+T\_offset$$

and T3 represents the relative time delay of the service link, T4 represents the relative time delay of the feeder link, and T_offset represents a preset offset;

perform time delay compensation on a transmitting end signal based on the total relative time delay compensation value.

In one embodiment, the compensation device is specifically configured to:

obtain a parameter T_ref_total notified by a network side, and T_ref_total=t3_ref+t4_ref-T_offset, t3_ref represents a reference time delay of the service link, t4_ref represents a reference time delay of the feeder link, and T_offset represents a preset offset;

determine a total relative time delay compensation value T_total by using T_ref_total, and T_total=t3+t4−T_ref_total;

perform time delay compensation on a transmitting end signal based on the total relative time delay compensation value.

On the network side, another time delay compensation control apparatus provided by embodiments of the present application includes:

a determining device configured to determine control parameters for instructing a terminal to perform time delay compensation based on a relative time delay of a service link and a relative time delay of a feeder link in a satellite communication system NTN;

a notification device configured to notify the terminal of the control parameters.

In one embodiment, the control parameters include a parameter for instructing the terminal to determine the relative time delay of the service link: a reference distance d3_$ref$ or a reference time delay t3_$ref$ of the service link;

the control parameters further include a parameter for instructing the terminal to determine the relative time delay of the feeder link: a reference distance d4_$ref$ or a reference time delay t4_$ref$ of the feeder link.

In one embodiment, notifying the terminal of the parameter for instructing the terminal to determine the relative time delay of the service link specifically includes: issuing broadcast signaling or other downlink signaling so that the terminal obtains the reference distance d3_$ref$ or the reference time delay t3_$ref$ of the service link.

In one embodiment, the determining device is specifically configured to:

issue broadcast signaling or other downlink signaling to assist the terminal in obtaining an actual location of a gateway station, so that the terminal determines the reference distance d4_$ref$ of the feeder link or the reference time delay t4_$ref$ of the feeder link according to the actual location of the gateway station;

or issue broadcast signaling or other downlink signaling so that the terminal obtains the reference distance d4_$ref$ of the feeder link or the reference time delay t4_$ref$ of the feeder link.

In one embodiment, when the processor notifies the reference distance d3_$ref$ or reference time delay t3_$ref$ of the service link through broadcast signaling or notifies the reference distance d4_$ref$ of the feeder link or the reference time delay t4_$ref$ of the feeder link through broadcast signaling, the processor is further configured to notify a starting time from which the reference distance or reference time delay becomes effective.

In one embodiment, the control parameters further include a preset offset T_offset, so that the terminal determines a total relative time delay compensation value T_total based on the relative time delay of the service link, the relative time delay of the feeder link and the offset T_offset, and performs time delay compensation on a transmitting end signal based on T_total.

In one embodiment, the control parameters include T_ref_total, so that the terminal determines a total relative time delay compensation value T_total based on T_ref_total, an absolute time delay of the service link and an absolute time delay of the feeder link, and performs time delay compensation on a transmitting end signal based on T_total;

and T_ref_total=t3_$ref$+t4_$ref$-T_offset, t3_$ref$ represents the reference time delay of the service link, t4_$ref$ represents the reference time delay of the feeder link, T_offset represents a preset offset; and T_total=t3+t4−T_ref_total.

In one embodiment, the determining device is further configured to:

obtain the relative time delay of the service link and the relative time delay of the feeder link reported by the terminal.

Another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

Figure 1:
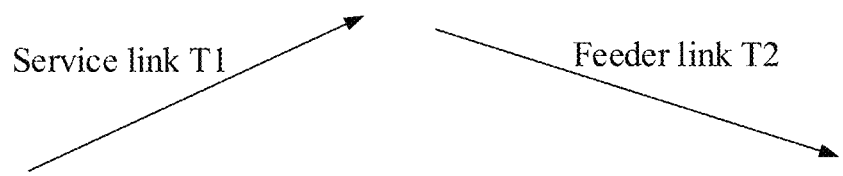
FIG. 1 shows a schematic diagram of the time delay of the NTN system in the prior art.

The embodiments of the present application will be described clearly and completely below in combination with the accompanying drawings in the embodiments of the present application.

The embodiments of the present application provide time delay compensation and its control methods and apparatuses, to perform the time delay compensation based on the relative time delay of the service link and the relative time delay of the feeder link, provide an uplink timing mechanism of the NTN system, and ensure the reliability of the synchronization establishment process of the NTN system and the timing accuracy of the subsequent data transmission process.

Here, the method and apparatus are based on the same application concept. Since the principle of solving the problem in the method is similar to that in the apparatus, the implementations of the apparatus and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network side. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network side, wherein the rest of the access network may include IP networks. The network device can further coordinate the attribute management of the air interface. For example, the network device involved in the embodiments of the present application can be a network device (Base Transceiver Station (BTS)) in the GSM system or CDMA system, or can be a network device (NodeB) in the WCDMA system, or can be an evolutional network device (evolutional Node B (eNB or e-NodeB)) in the LTE system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments.

Embodiments of the present application design an uplink timing mechanism of the NTN system. The core idea is: the UE performs the compensation for the relative time delay of a service link and the relative time delay of a feeder link, and the gateway station (including gNB) performs no compensation. The compensation implementation may include two steps: one is user-level time delay compensation, which targets the difference in service link time delays of different users in the same cell; and the other is cell-level time delay compensation, in which the common compensation is performed on the feeder links for all users in the same cell. The compensation can be performed directly based on the relative time delay, or an additional offset value can be used based on the relative time delay, so that the signals of all users can arrive at the gateway station at the time of integral-multiple slots.

It should be noted that the gateway station is a physical entity, the gateway and gNB are logical function entities, the gNB is responsible for controlling the scheduling function, and the gateway is a signal forwarding entity. If there is no special description in the following, the gateway station includes two function entities: gateway and gNB.

In embodiments of the present application, the terminal reports the relative time delay T3 of the service link and the relative time delay T4 of the feeder link to the network side. There are two specific reasons as follows.

1. If the terminal does not report to the network side, the network side cannot obtain the real TA value after timing after the terminal compensates for the relative time delay by itself, which brings difficulties to perform the scheduling of subsequent uplink data transmission of the random access process.

2. In the traditional terrestrial communication system, the network (gNB) performs the TA maintenance, so there is no need for the terminal to report the TA. In addition, since the terminal cannot obtain the size of the radius of the current cell, it is not feasible to report the TA value.

The calculation schemes for the relative time delay T3 of the service link and the relative time delay T4 of the feeder link are respectively given below.

A) The relative time delay T3 of the service link

The relative time delay T3 of the service link is defined as the difference between the absolute distance of the service link and the reference distance of the service link divided by the speed of light, that is:

$$T3=(d3-d3\_ref)/c=t3-t3\_ref \qquad (1)$$

and c represents the speed of light, and the value thereof is $3.0*10^8$ (m/s); d3 represents the absolute distance of the service link, i.e., the straight-line distance from the satellite to the user; $t3=d3/c$, and t3 represents the absolute time delay of the service link and corresponds to T1 in FIG. 1; d3_ref represents the reference distance of the service link, i.e., the straight-line distance from the satellite to a certain location in the coverage area, and this location may be any location on the ground or in the air; t3_ref=d3_ref/c, and t3_ref represents the reference time delay of the service link.

The reference distance d3_ref or the reference time delay t3_ref of the service link can be obtained by one of four following methods.

Method A.1): the protocol predefines the reference distance d3_ref or the reference time delay t3_ref of the service link as a fixed value. In one embodiment, a satellite-based fixed value or a cell-based fixed value may be used.

Method A.2): the UE obtains the reference distance d3_ref or the reference time delay t3_ref of the service link through the broadcast signaling or other downlink signaling issued by the network side. In one embodiment, the shortest distance from the satellite to the ground cell is used as the reference distance d3_ref, or the shortest time delay for the satellite to reach the ground cell is used as the reference time delay t3_ref.

Method A.3): the protocol predefines the reference distance d3_ref or reference time delay t3_ref of the service link as a value associated with latitude, and the UE obtains the current reference distance d3_ref or reference time delay t3_ref according to the current latitude information.

Method A.4): the UE obtains the reference distance d3_ref or the reference time delay t3_ref of the service link according to the ephemeris information. In one embodiment, the UE obtains the shortest distance from the satellite to the ground cell where the UE is located as the reference distance d3_ref according to the ephemeris information, or the UE obtains the shortest time delay for the satellite to reach the ground cell where the UE is located as the reference time delay t3_ref according to the ephemeris information.

Here, regarding the ephemeris information, the satellite orbit model is also called the ephemeris model, which provides the information for the terminal to determine the precise location of the satellite, so that the terminal can target the satellite for positioning. Relevant parameters are one of the important contents in the auxiliary data.

B) The relative time delay T4 of the feeder link

The relative time delay T4 of the feeder link is defined as the difference between the absolute distance of the feeder link and the reference distance of the feeder link divided by the speed of light, that is:

$$T4=(d4-d4\_ref)/c=t4-t4\_ref \quad (2)$$

and c represents the speed of light, and the value thereof is $3.0*10^8$ (m/s); d4 represents the absolute distance of the feeder link, i.e., the straight-line distance from the gateway station to the target satellite; t4=d4/c, and t4 represents the absolute time delay of the feeder link and corresponds to T2 in FIG. 1; d4_ref represents the reference distance of the feeder link, where it is considered that the orbital positions of the same satellite at different times are different and that the orbital positions of different satellites at the same time are also different, so the reference distance d4_ref of the feeder link may be defined as the straight-line distance from the gateway station to a certain point on the orbit of the target satellite, or defined as the straight-line distance from the gateway station to a certain satellite at a certain moment, or defined as a reference distance derived from the absolute distances between the gateway station and the satellites. The specific implementation or algorithm can be determined according to actual needs. t4_ref=d4_ref/c, and t4_ref represents the reference time delay of the feeder link.

The reference distance d4_ref or the reference time delay t4_ref of the feeder link can be obtained by one of three following methods.

Method B.1): the UE obtains the actual location of the gateway station (including gNB) through broadcast signaling or other downlink signaling issued by the network side, and determines the reference distance d4_ref or the reference time delay t4_ref of the feeder link based on the actual location of the gateway station. This method may further include two cases.

CASE B.1-1: when one gateway station is associated with multiple satellites, in order to ensure that the uplink received signals of the feeder links from different satellites arrive at the gateway station at the same time, the minimum of absolute distances or absolute time delays of feeder links of multiple satellites associated with one gateway station is used as the reference distance d4_ref of the feeder link, or the minimum of absolute time delays of feeder links of multiple satellites associated with one gateway station is used as the reference time delay t4_ref.

CASE B.1-2: when one gateway station is associated with one satellite and the distance from the same target satellite to the gateway station changes at different times, the UE can estimate the change in the absolute distance of the feeder link for compensation through the location of the gateway station and the ephemeris information of the target satellite, to ensure that the uplink received signals of the feeder link from the same target satellite at different times arrive at the gateway station at the same time.

It is assumed that that t1 represents the moment when the gateway station sends the broadcast signaling, t2 represents the moment when the UE receives the broadcast signaling, t2=t1+delta_t, and delta_t represents the time delay of the air interface through which the broadcast signaling is sent from the gateway station to the UE. At this time, d4 in formula (2) represents the straight-line distance of the feeder link from the target satellite to the gateway station at the time t2, and t4=d4/c represents the absolute time delay of the feeder link at the time t2; d4_ref represents the straight-line distance of the feeder link from the target satellite to the gateway station at the time t1, and t4_ref=d4_ref/c represents the reference time delay of the feeder link at the time t1.

CASE B.1-3: when one gateway station is associated with one satellite, the reference distance d4_ref or the reference time delay t4_ref can be 0. At this time, the relative time delay T4 of the feeder link is equal to the absolute time delay t4 of the feeder link. When the reference time delay of the service link and the reference time delay of the feeder link are both 0, the timing relationship of subframes of the UE in the NTN system is consistent with the timing relationship of subframes of the network side.

Method B.2): the UE obtains the reference distance d4_ref or the reference time delay t4_ref of the feeder link from the gateway station (including gNB) to the satellite through broadcast signaling or other downlink signaling issued by the network side.

Method B.3): the protocol predefines the reference distance d4_ref or reference time delay t4_ref of the feeder link as a value associated with latitude, and the UE obtains the current reference distance d4_ref or reference time delay t4_ref according to the current latitude information.

Among the three methods described above, Method B.1) is applied for the PUSCH/PUCCH/SRS using the normal CP format, and Method B.2) and Method B.3) are applied for the PUSCH/PUCCH/SRS using the extended CP format.

For the four methods in Method A of calculating the reference distance or reference time delay of the service link and the three methods in Method B for calculating the reference distance or reference time delay of the feeder link described above, twelve schemes can be obtained by pair-wise combination.

C) Methods for the UE to perform the time delay compensation based on the relative time delay of the service link and the relative time delay of the feeder link.

The UE performs the time delay compensation according to the relative time delay T3 of the service link and the relative time delay T4 of the feeder link obtained by A) and B), including:

adding an offset T_offset to the sum (T3+T4) of the relative time delay T3 of the service link and the relative time delay T4 of the feeder link, that is, the total time delay compensation value T_total is:

$$T\_total = T3 + T4 + T\_offset \qquad (3)$$

and the offset value T_offset is used to align the time when the signals of all users arrive at the gateway station with the integral-multiple time slots, and T_offset can be calculated by the user separately or notified through broadcast signaling or other downlink signaling of the network side.

In one embodiment, a parameter T_ref_total notified by the network side is obtained, and T_ref_total=t3_ref+t4_ref-T_offset, t3_ref represents a reference time delay of the service link, t4_ref represents a reference time delay of the feeder link, and T_offset represents a preset offset; and the total relative time delay compensation value T_total is determined by using T_ref_total, and T_total=t3+t4-T_ref_total.

The UE performs the time delay compensation on a transmitting end signal based on the total relative time delay compensation value.

That is to say, in embodiments of the present application, the network side can notify the control parameters for instructing the terminal to perform the time delay compensation based on the relative time delay of the service link and the relative time delay of the feeder link in the satellite communication system NTN by two following methods.

Method 1: notify the reference distance d3_ref or reference time delay t3_ref of the service link, the reference distance d4_ref or reference time delay t4_ref of the feeder link, and the offset value T_offset, respectively.

Method 2: directly notify the accumulated value of the reference distance d3_ref or reference time delay t3_ref of the service link, the reference distance d4_ref or reference time delay t4_ref of the feeder link and the offset value T_offset, that is, T_ref_total=t3_ref+t4_ref-T_offset. When this method is adopted, there is no need for the terminal to determine the relative time delay T3 of the service link and the relative time delay T4 of the feeder link respectively. T_total is directly calculated according to the following formula T_total=t3+t4-T_ref_total.

Several specific embodiments will be given below.

Embodiment 1: the UE uses Method A.1) to compensate for the relative time delay of the service link, and the UE uses Method B.1) to compensate for the relative time delay of the feeder link.

In the Embodiment 1, the UE uses a combination of Method A.1) and Method B.1) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_ref of the service link divided by the speed of light c, that is, T3=(d3-d3_ref)/c=t3-t3_ref, and the reference distance d3_ref or the reference time delay t3_ref of the service link is obtained by the above Method A.1), that is, the protocol predefines the reference distance d3_ref or the reference time delay t3_ref on the straight-line distance between the UE and the satellite as a fixed value. In one embodiment, a satellite-based fixed value or a cell-based fixed value may be used. Or the reference distance d3_ref or the reference time delay t3_ref may also be zero. Here, when the reference distance d3_ref or the reference time delay t3_ref takes a value of 0, the relative time delay T3 of the service link is equal to the absolute time delay t3 of the service link. When the reference time delay of the service link and the reference time delay of the feeder link are both 0, the timing relationship of subframes of the UE in the NTN system is consistent with the timing relationship of subframes of the network side.

Figure 2:
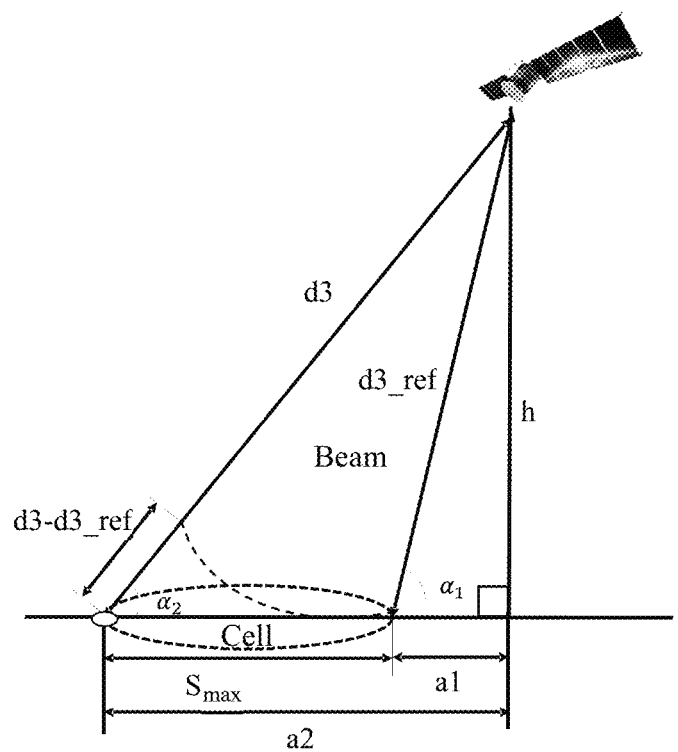
FIG. 2 shows a schematic diagram of a service link of the NTN system according to embodiments of the present application.

The cell-based fixed value is as shown in FIG. 2, that is, in the same cell, the reference distance d3_ref of the service link represents the shortest distance from the satellite to the ground in the same cell. In FIG. 2, all users are located in a ground cell, h represents the vertical distance from the satellite to the ground, $\alpha_1$ represents the maximum pitch angle of a point in the ground cell closest to the satellite, $\alpha_2$ represents the minimum pitch angle of a point in the ground cell farthest from the satellite, $S_{max}$ represents twice the cell radius, $a_1$ is the distance between the point in the ground cell closest to the satellite and the vertical projection point of the satellite on the ground, and $a_2$ is the distance between the point in the ground cell farthest from the satellite and the vertical projection point of the satellite on the ground.

B) The relative time delay T4 of the feeder link

The terminal reports the relative time delay T4 of the feeder link to the network side.

The relative time delay T4 of the feeder link is defined as the difference between the absolute distance d4 of the feeder link and the reference distance d4_ref of the feeder link divided by the speed of light c, that is, T4=(d4-d4_ref)/c=t4-t4_ref.

Here, the reference distance d4_ref or the reference time delay t4_ref of the feeder link is obtained by Method B.1, that is, the UE obtains the actual location of the gateway station (gNB) through broadcast signaling or other downlink signaling issued by the network side. This method is applicable to the PUSCH/PUCCH/SRS using the normal CP format.

Figure 3:
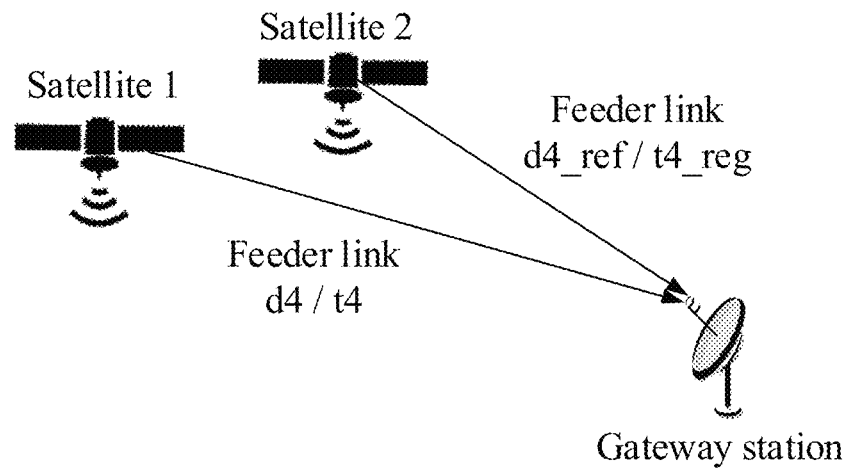
FIG. 3 shows a schematic diagram of a feeder link of the NTN system according to embodiments of the present application.
Figure 4:
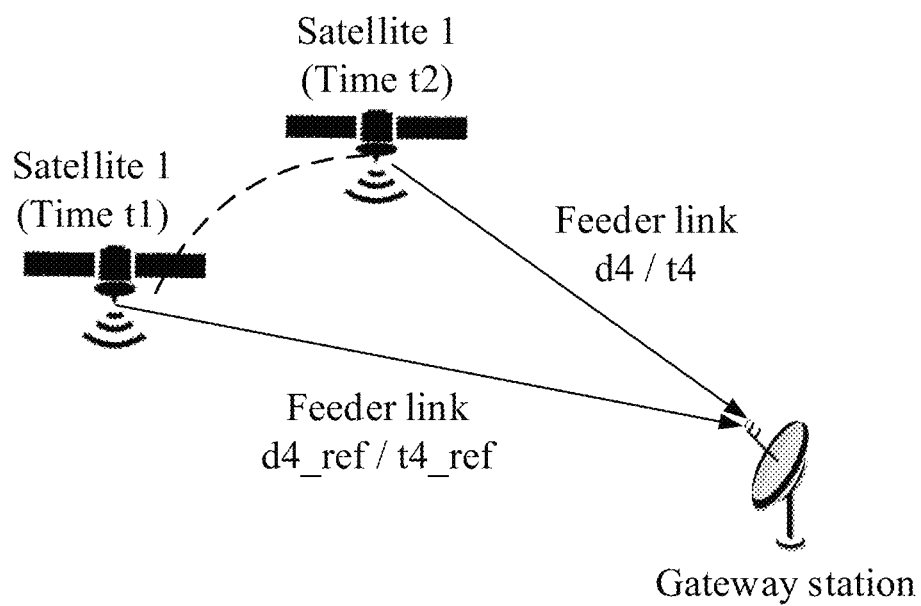
FIG. 4 shows a schematic diagram of a feeder link of the NTN system according to embodiments of the present application.

CASE B.1-1: when one gateway station is associated with multiple satellites, in order to ensure that the uplink received signals of the feeder links from different satellites arrive at the gateway station at the same time, the minimum of absolute distances or absolute time delays of feeder links of multiple satellites associated with one gateway station is used as the reference distance d4_ref of the feeder link or the reference time delay t4_ref. As shown in FIG. 3, one gateway station is associated with two satellites, and the absolute distance of the feeder link from the satellite 2 to the gateway station is less than the absolute distance of the feeder link from the satellite 1 to the gateway station. Therefore, the absolute distance of the feeder link from the satellite 2 to the gateway station is selected as the reference distance d4_ref of the feeder link. For the satellite 2, the relative time delay of the feeder link is T4=(d4(satellite 2)-d4_ref (satellite 2))/c=0; and for the satellite 1, the relative time delay of the feeder link is T4=(d4(satellite 1)-d4_ref (satellite 2))/c=(d4-d4_ref)/c=t4-t4_ref CASE B.1-2: when the distance from the same target satellite to the gateway station changes at different times, the UE can estimate the change in the distance of the feeder link for compensation through the location of the gateway station and the ephemeris information of the target satellite, to ensure that the uplink received signals of the feeder link from the same target satellite at different times at the gateway station arrive at the same time. As shown in FIG. 4, it is assumed that that t1 represents the moment when the gateway station sends the broadcast signaling, t2 represents the moment when the UE receives the broadcast signaling, t2=t1+*delta-t*, and delta_t represents the time delay of the air interface through which the broadcast signaling is sent from the gateway station to the UE. At this time, d4 in formula (2) represents the straight-line distance of the feeder link from the target satellite to the gateway station at the time t2, and d4_*ref* represents the straight-line distance of the feeder link from the target satellite to the gateway station at the time t1.

Further, when a user sends an uplink signal to the gateway station, the pre-compensation for the time delay after the user's uplink signal arrives at the gateway station is also considered in addition to considering that the time delay compensation is performed based on the instruction of the broadcast signaling or other downlink signaling issued by the network side.

Further, between the time when the user receives the previous broadcast signaling or other downlink signaling and the time when the user receives the next broadcast signaling or other downlink signaling, the user uses the reference time delay notified by the previous broadcast signaling or other downlink signaling for compensation, or the user performs interpolation based on the time delays indicated by two pieces of broadcast signaling or other downlink signaling at the same gateway station to obtain the timing compensation required for the uplink signal sent by the user at any time.

Figure 5:
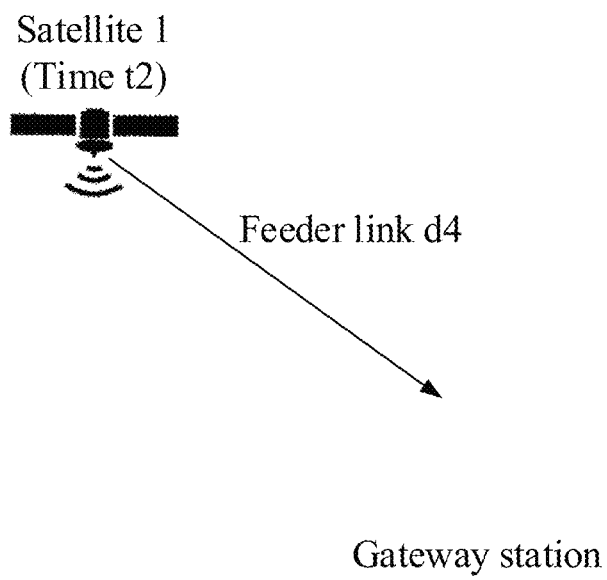
FIG. 5 shows a schematic diagram of a feeder link of the NTN system according to embodiments of the present application.

CASE B.1-3: as shown in FIG. 5, when one gateway station is associated with one satellite, the reference distance d4_*ref* or the reference time delay t4_*ref* can be 0. At this time, the relative time delay T4 of the feeder link is equal to the absolute time delay t4 of the feeder link. When the reference time delay of the service link and the reference time delay of the feeder link are both 0, the timing relationship of subframes of the UE in the NTN system is consistent with the timing relationship of subframes of the network side.

Embodiment 2: the UE uses Method A.1) to compensate for the relative time delay of the service link, and the UE uses Method B.2) to compensate for the relative time delay of the feeder link.

In the Embodiment 2, the UE uses a combination of Method A.1) and Method B.2) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_*ref* of the service link divided by the speed of light c, that is, T3=(d3−d3_*ref*)/c=t3−t3_*ref* and the reference distance d3_*ref* or the reference time delay t3_*ref* of the service link is obtained by Method A.1), that is, the protocol predefines the reference distance d3_*ref* or the reference time delay t3_*ref* on the straight-line distance between the UE and the satellite as a fixed value. In one embodiment, a satellite-based fixed value or a cell-based fixed value may be used.

Figure 6:
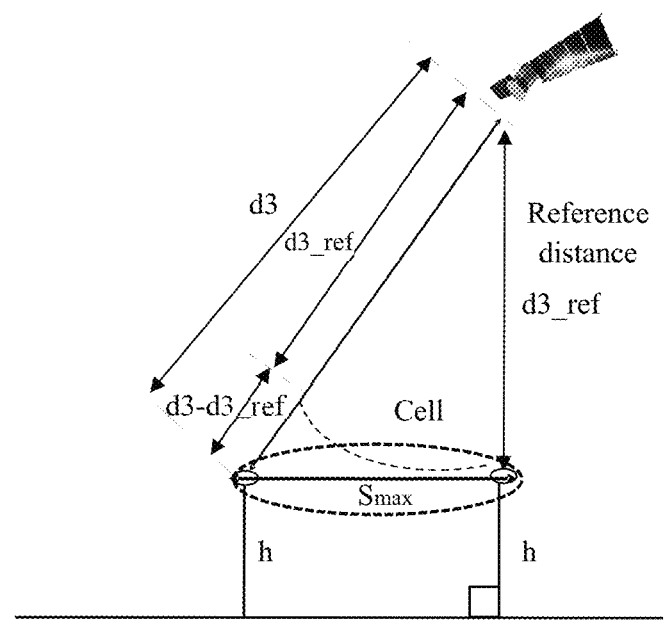
FIG. 6 shows a schematic diagram of a service link of the NTN system according to embodiments of the present application.

As shown in FIG. 6, considering that the UE is located high in the sky, the reference distance d3_*ref* or the reference time delay t3_*ref* is a satellite-based fixed value. In FIG. 6, all users are located in a cell at a certain height in the air, h represents the vertical distance from the cell at the certain height in the air to the ground, and $S_{max}$ represents twice the cell radius.

B) The relative time delay T4 of the feeder link

The terminal reports the relative time delay T4 of the feeder link to the network side.

The relative time delay T4 of the feeder link is defined as the difference between the absolute distance d4 of the feeder link and the reference distance d4_*ref* of the feeder link divided by the speed of light c, that is, T4=(d4−d4_*ref*)/c=t4−t4_*ref*, and the reference distance d4_*ref* of the feeder link is obtained by Method B.2, that is, the UE obtains the reference distance d4_*ref* or the reference time delay t4_*ref* of the feeder link from the gateway station (gNB) to the satellite through the broadcast signaling or downlink signaling issued by the network side. This method is applicable to the PUSCH/PUCCH/SRS using the extended CP format.

As shown in FIG. 4, it is assumed that that t1 represents the moment when the gateway station sends the broadcast signaling or downlink signaling, t2 represents the moment when the UE receives the broadcast signaling or downlink signaling, t2=t1+*delta_t*, and delta_t represents the time delay of the air interface through which the broadcast signaling or downlink signaling is sent from the gateway station to the UE. The gateway station knows the straight-line distance d4_*ref* of the feeder link from the gateway station to the satellite 1 at the time t1 and the straight-line distance d4 representing the feeder link from the target satellite to the gateway station at the time t2 through the ephemeris information of the satellite 1, and the gateway station notifies the UE of both d4_*ref* and d4. The UE calculates the relative time delay T4 of the feeder link according to the above formula (2); or the gateway station directly notifies the UE of the calculated relative time delay T4 of the feeder link.

Further, when a user sends an uplink signal to the gateway station, the pre-compensation performed on the time delay after the user's uplink signal arrives at the gateway station is also considered in addition to considering that the time delay compensation is performed based on the instruction of the broadcast signaling or downlink signaling issued by the network side.

Further, between the time when the user receives the previous broadcast signaling or downlink signaling and the time when the user receives the next broadcast signaling or downlink signaling, the user uses the reference time delay notified by the previous broadcast signaling or downlink signaling for compensation, or the user performs interpolation based on the time delays indicated by two pieces of broadcast signaling or downlink signaling at the same gateway station to obtain the timing compensation required for the uplink signal sent by the user at any time.

Embodiment 3: the UE uses Method A.1) to compensate for the relative time delay of the service link+the UE uses Method B.3) to compensate for the relative time delay of the feeder link.

In the Embodiment 3, the UE uses a combination of Method A.1) and Method B.3) for the relative time delay compensation.

A) The relative time delay T3 of the service link: the specific content is the same as that in the Embodiment 1 and Embodiment 2.

B) The relative time delay T4 of the feeder link

The terminal reports the relative time delay T4 of the feeder link to the network side.

The relative time delay T4 of the feeder link is defined as the difference between the absolute distance d4 of the feeder link and the reference distance d4_*ref* of the feeder link divided by the speed of light c, that is, T4=(d4−d4_*ref*)/c=t4−t4_*ref*.

Here, the reference distance d4_*ref* or reference time delay t4_*ref* of the feeder link is obtained by Method B.3), that is, the protocol predefines the reference distance d4_*ref* or reference time delay t4_*ref* on the straight-line distance from the gateway station (gNB) to the satellite as a value associated with latitude, and the UE obtains the current reference distance d4_*ref* or reference time delay t4_*ref* according to the current latitude information. This method is applicable to the PUSCH/PUCCH/SRS using the extended CP format.

Figure 7:
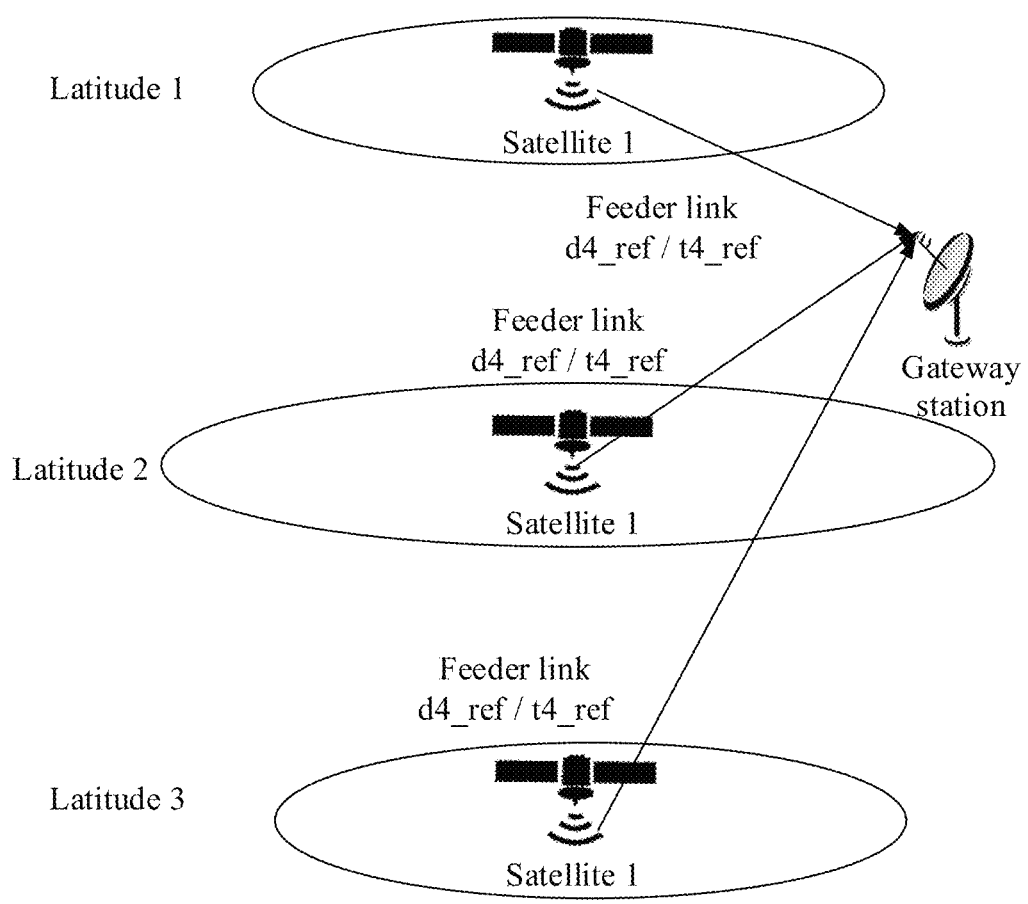
FIG. 7 shows is a schematic diagram of a feeder link of the NTN system according to embodiments of the present application.

As shown in FIG. 7, the reference distances d4_*ref* or the reference time delays t4_*ref* of different feeder links are respectively defined on three different latitudes 1, latitude 2 and latitude 3.

Embodiment 4: the UE uses Method A.2) to compensate for the relative time delay of the service link, and the UE uses Method B.1) to compensate for the relative time delay of the feeder link.

In the Embodiment 4, the UE uses a combination of Method A.2) and Method B.1) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_*ref* of the service link divided by the speed of light c, that is, T3=(d3−d3_*ref*)/c=t3−t3_*ref*, and the reference distance d3_*ref* or the reference time delay t3_*ref* of the service link is obtained by Method A.2), that is, the UE obtains the reference distance d3_*ref* or the reference time delay t3_*ref* on the straight-line distance from the UE to the satellite through the broadcast signaling or other downlink signaling issued by the network side. In one embodiment, the shortest distance or the shortest time delay for the satellite to reach the ground cell is used as the reference distance d3_*ref* or the reference time delay t3_*ref*.

The difference between the Embodiment 4 and the Embodiment 1 is: the reference distance d3_*ref* or the reference time delay t3_*ref* is predefined by the protocol in the Embodiment 1; while the UE obtains the reference distance d3_*ref* or the reference time delay t3_*ref* through the broadcast signaling or other downlink signal issued by the network side in the Embodiment 4.

B) The relative time delay T4 of the feeder link: the specific content is the same as that in the Embodiment 1.

Embodiment 5: the UE uses Method A.2) to compensate for the relative time delay of the service link+the UE uses Method B.2) to compensate for the relative time delay of the feeder link.

In the Embodiment 5, the UE uses a combination of Method A.2) and Method B.2) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_*ref* of the service link divided by the speed of light c, that is, T3=(d3−d3_*ref*)/c=t3−t3_*ref*, and the reference distance d3_*ref* or the reference time delay t3_*ref* of the service link is obtained by Method A.2), that is, the UE obtains the reference distance d3_*ref* or the reference time delay t3_*ref* on the straight-line distance from the UE to the satellite through the broadcast signaling. In one embodiment, the shortest distance or the shortest time delay for the satellite to reach the ground cell is used as the reference distance d3_*ref* or the reference time delay t3_*ref*.

The difference between the Embodiment 5 and the Embodiment 2 is: the reference distance d3_*ref* or the reference time delay t3_*ref* is predefined by the protocol in the Embodiment 2; while the UE obtains the reference distance d3_*ref* or the reference time delay t3_*ref* through the broadcast signaling issued by the network side in the Embodiment 5.

B) The relative time delay T4 of the feeder link: the specific content is the same as that in the Embodiment 2.

Embodiment 6: the UE uses Method A.2) to compensate for the relative time delay of the service link+the UE uses Method B.3) to compensate for the relative time delay of the feeder link.

In the Embodiment 6, the UE uses a combination of Method A.2) and Method B.3) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_*ref* of the service link divided by the speed of light c, that is, T3=(d3−d3_*ref*)/c=t3−t3_*ref*, and the reference distance d3_*ref* or the reference time delay t3_*ref* of the service link is obtained by Method A.2), that is, the UE obtains the reference distance d3_*ref* or the reference time delay t3_*ref* on the straight-line distance from the UE to the satellite through the broadcast signaling. In one embodiment, the shortest distance or the shortest time delay for the satellite to reach the ground cell is used as the reference distance d3_*ref* or the reference time delay t3_*ref*.

The difference between the Embodiment 6 and the Embodiment 3 is: the reference distance d3_*ref* or the reference time delay t3_*ref* is predefined by the protocol in the Embodiment 3; while the UE obtains the reference distance d3_*ref* or the reference time delay t3_*ref* through the broadcast signaling issued by the network side in the Embodiment 6.

B) The relative time delay T4 of the feeder link: the specific content is the same as that in the Embodiment 3.

Embodiment 7: the UE uses Method A.3) to compensate for the relative time delay of the service link+the UE uses Method B.1) to compensate for the relative time delay of the feeder link.

In the Embodiment 7, the UE uses a combination of Method A.3) and Method B.1) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_*ref* of the service link divided by the speed of light c, that is, T3=(d3−d3_*ref*)/c=t3−t3_*ref*, and the reference distance d3_*ref* or the reference time delay t3_*ref* of the service link is obtained by the above Method A.3), that is, the protocol predefines the reference distance d3_*ref* or the reference time delay t3_*ref* on the straight-line distance between the UE and the satellite as a value associated with latitude, and the UE obtains the current reference distance d3_ref or reference time delay t3_ref according to the current latitude information.

Figure 8:
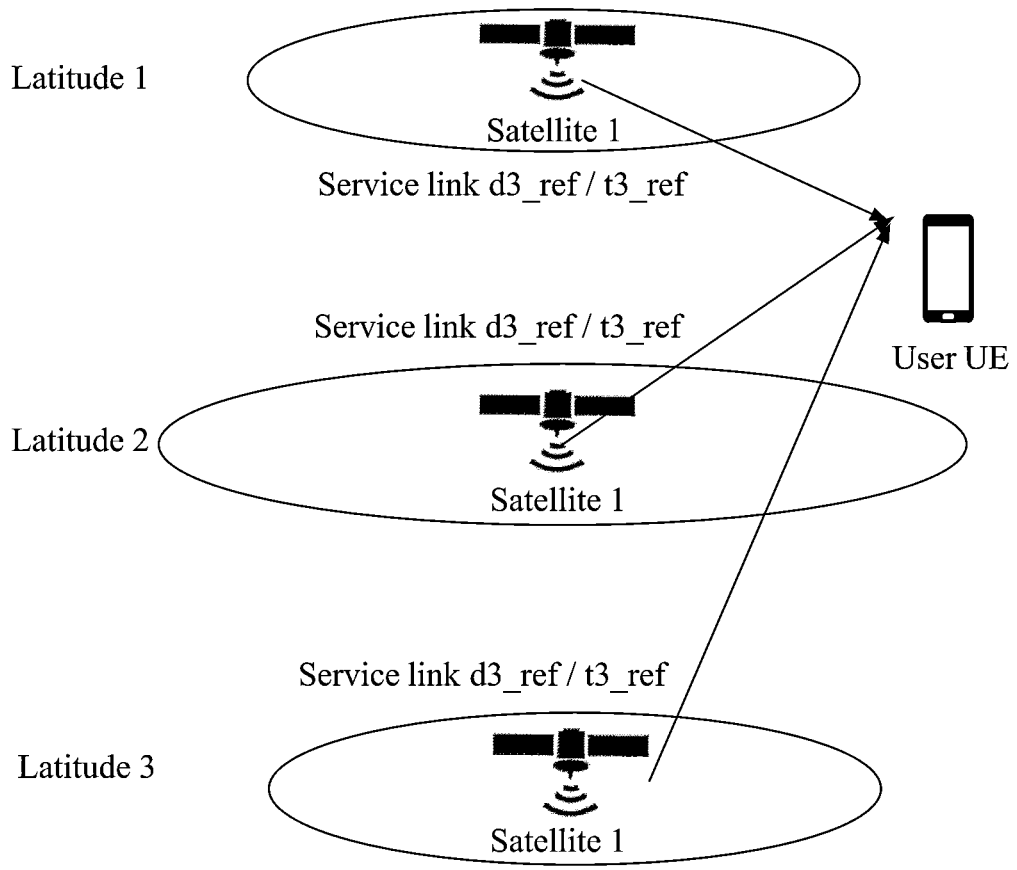
FIG. 8 shows a schematic diagram of a service link of the NTN system according to embodiments of the present application.

As shown in FIG. 8, the reference distances d3_ref or the reference time delays t3_ref of different service links are respectively defined on three different latitudes 1, latitude 2 and latitude 3.

B) The relative time delay T4 of the feeder link: the specific content is the same as that in the Embodiment 1.

Embodiment 8: the UE uses Method A.3) to compensate for the relative time delay of the service link+the UE uses Method B.2) to compensate for the relative time delay of the feeder link.

In the Embodiment 8, the UE uses a combination of Method A.3) and Method B.2) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_ref of the service link divided by the speed of light c, that is, T3=(d3-d3_ref)/c=t3-t3_ref, and the reference distance d3_ref or the reference time delay t3_ref of the service link is obtained by the above Method A.3), that is, the protocol predefines the reference distance d3_ref or the reference time delay t3_ref on the straight-line distance between the UE and the satellite as a value associated with latitude, and the UE obtains the current reference distance d3_ref or reference time delay t3_ref according to the current latitude information. As shown in FIG. 8, the reference distances d3_ref or the reference time delays t3_ref of different service links are respectively defined on three different latitudes 1, latitude 2 and latitude 3.

B) The relative time delay T4 of the feeder link: the specific content is the same as that in the Embodiment 2.

Embodiment 9: the UE uses Method A.3) to compensate for the relative time delay of the service link+the UE uses Method B.3) to compensate for the relative time delay of the feeder link.

In the Embodiment 9, the UE uses a combination of Method A.3) and Method B.3) for the relative time delay compensation.

A) The relative time delay T3 of the service link

The terminal reports the relative time delay T3 of the service link to the network side.

The relative time delay T3 of the service link is defined as the difference between the absolute distance d3 of the service link and the reference distance d3_ref of the service link divided by the speed of light c, that is, T3=(d3-d3_ref)/c=t3-t3_ref, and the reference distance d3_ref or the reference time delay t3_ref of the service link is obtained by the above Method A.3), that is, the protocol predefines the reference distance d3_ref or the reference time delay t3_ref on the straight-line distance between the UE and the satellite as a value associated with latitude, and the UE obtains the current reference distance d3_ref or reference time delay t3_ref according to the current latitude information. As shown in FIG. 8, the reference distances d3_ref or the reference time delays t3_ref of different service links are respectively defined on three different latitudes 1, latitude 2 and latitude 3.

B) The relative time delay T4 of the feeder link: the specific content is the same as that in the Embodiment 3.

Figure 9:
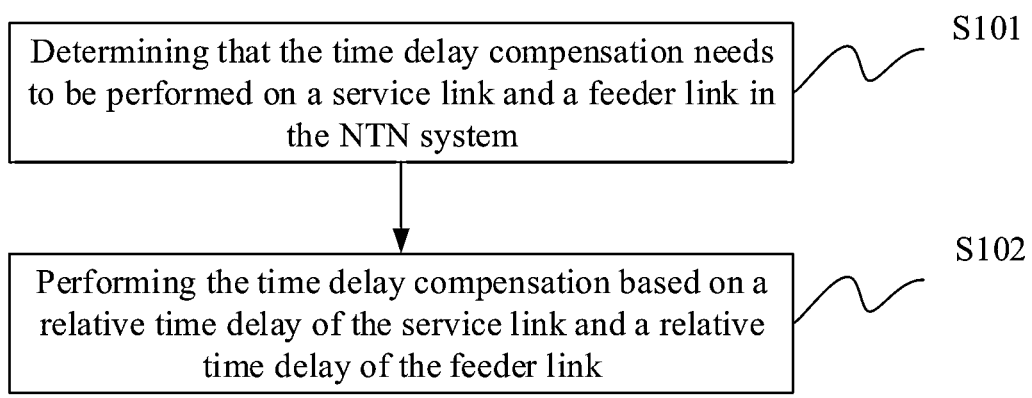
FIG. 9 shows a flow chart illustrating a time delay compensation method at the terminal side according to embodiments of the present application.

In summary, referring to FIG. 9, on the terminal side, a time delay compensation method provided by embodiments of the present application includes the following.

S101: determining that time delay compensation needs to be performed on a service link and a feeder link in the NTN system.

For example, when the data needs to be transmitted, it is determined that the time delay compensation needs to be performed on the service link and feeder link in the satellite communication system NTN, or the terminal determines that the time delay compensation needs to be performed on the service link and the feeder link in the satellite communication system NTN based on triggering by other methods. The details on how this step is implemented are not limited in the embodiment of the present application.

S102: performing the time delay compensation based on a relative time delay of the service link and a relative time delay of the feeder link.

The embodiment of the present application performs the time delay compensation based on the relative time delay of the service link and the relative time delay of the feeder link, provides an uplink timing mechanism of the NTN system, and ensures the reliability of the synchronization establishment process of the NTN system and the timing accuracy of the subsequent data transmission process.

In one embodiment, the method further includes: reporting the relative time delay of the service link and the relative time delay of the feeder link to a network side.

In one embodiment, the relative time delay of the service link is determined according to a reference distance or a reference time delay of the service link.

In one embodiment, the relative time delay of the service link is determined by the following formula:

$$T3=(d3-d3\_\text{ref})/c=t3-t3\_\text{ref}$$

and T3 represents the relative time delay of the service link; c represents the speed of light; d3 represents the absolute distance of the service link; t3=d3/c, and t3 represents the absolute time delay of the service link; d3_ref represents the reference distance of the service link; t3_ref=d3_ref/c, and t3_ref represents the reference time delay of the service link.

In one embodiment, the reference distance d3_ref or the reference time delay t3_ref of the service link is obtained by using one of four following methods:

first method: the reference distance d3_ref or the reference time delay t3_ref of the service link is predefined as a fixed value, by a protocol;

second method: obtaining the reference distance d3_ref or the reference time delay t3_ref of the service link through broadcast signaling or other downlink signaling issued by the network side;

third method: the reference distance d3_ref or the reference time delay t3_ref of the service link is predefined as a value associated with latitude, by a protocol;

fourth method: obtaining the reference distance d3_ref or the reference time delay t3_ref of the service link according to the ephemeris information, and the ephemeris information contains the information used by the terminal to determine the precise location of a satellite.

In one embodiment, when the second method is used, the reference distance d3_ref is a shortest distance from the satellite to a ground cell, or the reference distance d3_ref is the shortest distance from the satellite to the ground cell minus a distance offset value related to height, or the reference time delay t3_ref is a shortest time delay for the satellite to reach the ground cell, or the reference time delay t3_ref is the shortest time delay for the satellite to reach the ground cell minus a time delay offset value related to height. For example: different heights H correspond to different time delay offset values. H1 corresponds to t_offset1, and H2 corresponds to t_offset2.

In one embodiment, when the fourth method is used, a shortest distance from the satellite to a ground cell where the terminal is located is obtained according to the ephemeris information, and the shortest distance is used as the reference distance d3_ref; or a shortest time delay for the satellite to reach the ground cell where the terminal is located is obtained according to the ephemeris information, and the shortest time delay is used as the reference time delay t3_ref.

In one embodiment, the relative time delay of the feeder link is determined according to a reference distance or a reference time delay of the feeder link.

In one embodiment, the relative time delay of the feeder link is determined by the following formula:

$$T4=(d4-d4\_ref)/c=t4-t4\_ref$$

and T4 represents the relative time delay of the feeder link; c represents the speed of light; d4 represents the absolute distance of the feeder link; t4=d4/c, and t4 represents the absolute time delay of the feeder link; d4_ref represents the reference distance of the feeder link; t4_ref=d4_ref/c, and t4_ref represents the reference time delay of the feeder link.

In one embodiment, the reference distance d4_ref or the reference time delay t4_ref of the feeder link is obtained by using one of three following methods:

first method: obtaining the actual location of a gateway station through broadcast signaling or other downlink signaling issued by a network side, and determining the reference distance d4_ref of the feeder link or the reference time delay t4_ref of the feeder link according to the actual location of the gateway station;

second method: obtaining the reference distance d4_ref of the feeder link or the reference time delay t4_ref of the feeder link through broadcast signaling or other downlink signaling issued by the network side;

third method: the reference distance d4_ref of the feeder link or the reference time delay t4_ref of the feeder link is predefined as a value associated with latitude, by a protocol.

In one embodiment, when the first method is used:

the minimum of absolute distances or absolute time delays of feeder links of multiple satellites associated with one gateway station is used as the reference distance d4_ref of the feeder link or the reference time delay t4_ref of the feeder link according to the actual location of the gateway station; or the reference distance d4_ref of the feeder link or the reference time delay t4_ref of the feeder link is determined through the actual location of the gateway station and ephemeris information of a target satellite.

In one embodiment, the step of performing the time delay compensation based on the relative time delay of the service link and the relative time delay of the feeder link, specifically includes:

calculating the total relative time delay compensation value T_total by the following formula:

$$T\_total=T3+T4+T\_offset$$

and T3 represents the relative time delay of the service link, T4 represents the relative time delay of the feeder link, and T_offset represents a preset offset;

performing the time delay compensation on a transmitting end signal based on the total relative time delay compensation value.

In one embodiment, as another implementation, the step of performing the time delay compensation based on the relative time delay of the service link and the relative time delay of the feeder link, specifically includes:

obtaining a parameter T_ref_total notified by the network side, and T_ref_total=t3_ref+t4_ref-T_offset, t3_ref represents a reference time delay of the service link, t4_ref represents a reference time delay of the feeder link, and T_offset represents a preset offset;

determining the total relative time delay compensation value T_total by using T_ref_total, and T_total=t3+t4−T_ref_total;

performing the time delay compensation on a transmitting end signal based on the total relative time delay compensation value.

At this time, the terminal does not need to separately determine the relative time delay of the service link and the relative time delay of the feeder link, and can directly determine T_total based on T_ref_total.

Figure 10:
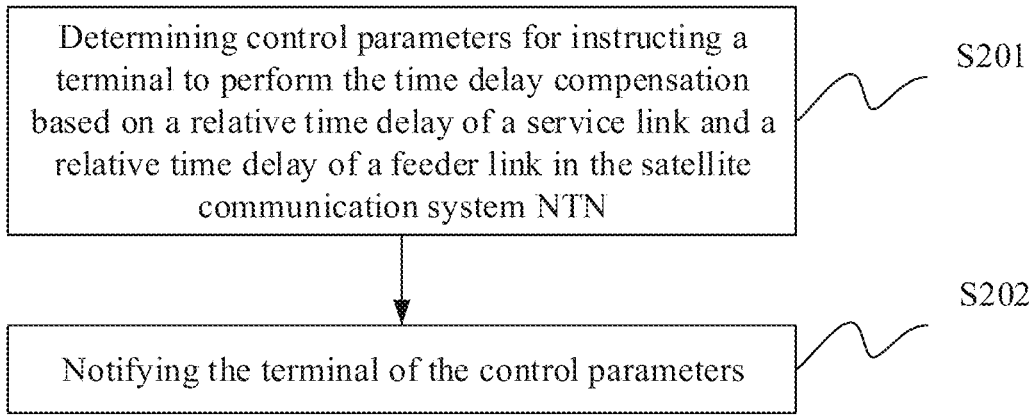
FIG. 10 shows a flow chart illustrating a time delay compensation control method at the network side according to embodiments of the present application.

Correspondingly, on the network side, referring to FIG. 10, a time delay compensation control method provided by embodiments of the present application includes the following.

S201: determining control parameters for instructing a terminal to perform the time delay compensation based on a relative time delay of a service link and a relative time delay of a feeder link in the satellite communication system NTN.

S202: notifying the terminal of the control parameters.

In one embodiment, the control parameters include a parameter for instructing the terminal to determine the relative time delay of the service link: a reference distance d3_ref or a reference time delay t3_ref of the service link;

the control parameters further include a parameter for instructing the terminal to determine the relative time delay of the feeder link: a reference distance d4_ref or a reference time delay t4_ref of the feeder link.

In one embodiment, the step of notifying the terminal of the parameter for instructing the terminal to determine the relative time delay of the service link specifically includes: issuing broadcast signaling or other downlink signaling so that the terminal obtains the reference distance d3_ref or the reference time delay t3_ref of the service link.

In one embodiment, the step of notifying the terminal of the parameter for instructing the terminal to determine the relative time delay of the feeder link specifically includes:

issuing broadcast signaling or other downlink signaling to assist the terminal in obtaining the actual location of a gateway station, so that the terminal determines the reference distance d4_ref of the feeder link or the reference time delay t4_ref of the feeder link according to the actual location of the gateway station;

or issuing broadcast signaling or other downlink signaling so that the terminal obtains the reference distance d4_ref of the feeder link or the reference time delay t4_ref of the feeder link.

In one embodiment, when notifying the reference distance d3_ref of the service link or the reference time delay t3_ref of the service link through broadcast signaling or notifying the reference distance d4_ref of the feeder link or the reference time delay t4_ref of the feeder link through broadcast signaling, the method further include: notifying a starting time (for example, timestamp) from which the reference distance (including the reference distance d3_ref of the service link and/or the reference distance d4_ref of the feeder link) or reference time delay (the reference time delay t3_ref of the service link, and/or the reference distance d4_ref of the service link)becomes effective. For the specific notification method, for example, the broadcast signaling or other downlink signaling may also be used.

In one embodiment, the control parameters further include a preset offset T_offset, so that the terminal determines the total relative time delay compensation value T_total based on the relative time delay of the service link, the relative time delay of the feeder link and the offset T_offset, and performs time delay compensation on a transmitting end signal based on T_total.

In one embodiment, as another manner, the control parameters include T_ref_total, so that the terminal determines the total relative time delay compensation value T_total based on T_ref_total, the absolute time delay of the service link and the absolute time delay of the feeder link, and performs time delay compensation on a transmitting end signal based on T_total;

and T_ref_total=t3_ref+t4_ref-T_offset, t3_ref represents the reference time delay of the service link, t4_ref represents the reference time delay of the feeder link, T_offset represents a preset offset; and T_total=t3+t4−T_ref_total.

In one embodiment, the method further includes:
obtaining the relative time delay of the service link and the relative time delay of the feeder link reported by the terminal.

Figure 11:
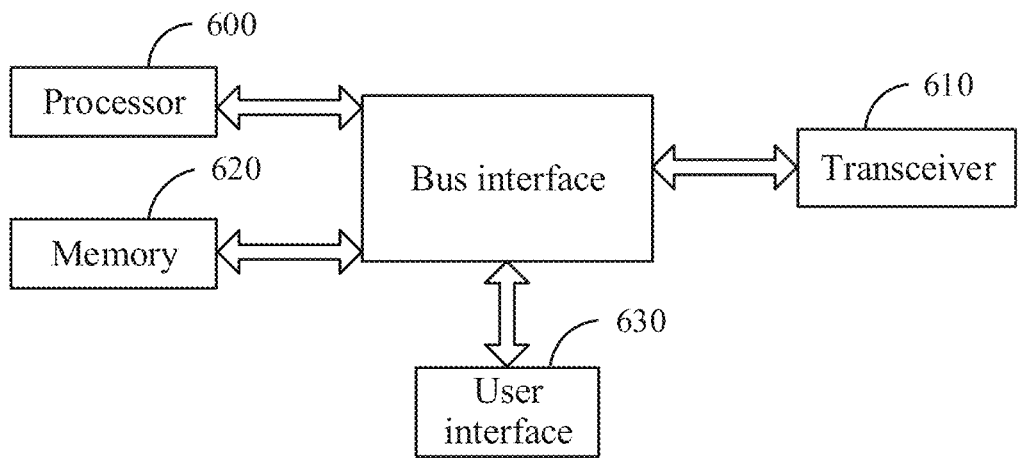
FIG. 11 shows a structural schematic diagram of a time delay compensation apparatus at the terminal side according to embodiments of the present application.

On the terminal side, referring to FIG. 11, a time delay compensation apparatus provided by embodiments of the present application includes:

a memory 620 configured to store program instructions;

a processor 600 configured to invoke the program instructions stored in the memory, and execute according to the obtained program:

determining that the time delay compensation needs to be performed on a service link and a feeder link in a satellite communication system NTN;

performing the time delay compensation based on a relative time delay of the service link and a relative time delay of the feeder link.

In one embodiment, the processor 600 is further configured to execute according to the obtained program: reporting the relative time delay of the service link and the relative time delay of the feeder link to the network side.

In one embodiment, the relative time delay of the service link is determined according to a reference distance or a reference time delay of the service link.

In one embodiment, the relative time delay of the service link is determined by the following formula:

$$T3=(d3-d3\_ref)/c=t3-t3\_ref$$

and T3 represents the relative time delay of the service link; c represents the speed of light; d3 represents the absolute distance of the service link; t3=d3/c, and t3 represents the absolute time delay of the service link; d3_ref represents the reference distance of the service link; t3_ref=d3_ref/c, and t3_ref represents the reference time delay of the service link.

In one embodiment, the reference distance d3_ref or the reference time delay t3_ref of the service link is obtained by using one of four following methods:

first method: the reference distance d3_ref or the reference time delay t3_ref of the service link is predefined as a fixed value, by a protocol;

second method: obtaining the reference distance d3_ref or the reference time delay t3_ref of the service link through broadcast signaling or other downlink signaling issued by the network side;

third method: the reference distance d3_ref or the reference time delay t3_ref of the service link is predefined as a value associated with latitude, by a protocol;

fourth method: obtaining the reference distance d3_ref or the reference time delay t3_ref of the service link according to the ephemeris information, and the ephemeris information contains the information used by the terminal to determine the precise location of a satellite.

In one embodiment, when the second method is used, the reference distance d3_ref is a shortest distance from the satellite to a ground cell, or the reference distance d3_ref is the shortest distance from the satellite to the ground cell minus a distance offset value related to height, or the reference time delay t3_ref is a shortest time delay for the satellite to reach the ground cell, or the reference time delay t3_ref is the shortest time delay for the satellite to reach the ground cell minus a time delay offset value related to height.

In one embodiment, when the fourth method is used, a shortest distance from the satellite to a ground cell where the terminal is located is obtained according to the ephemeris information, and the shortest distance is used as the reference distance d3_ref; or a shortest time delay for the satellite to reach the ground cell where the terminal is located is obtained according to the ephemeris information, and the shortest time delay is used as the reference time delay t3_ref.

In one embodiment, the relative time delay of the feeder link is determined according to a reference distance or a reference time delay of the feeder link.

In one embodiment, the relative time delay of the feeder link is determined by the following formula:

$$T4=(d4-d4\_ref)/c=t4-t4\_ref$$

and T4 represents the relative time delay of the feeder link; c represents the speed of light; d4 represents the absolute distance of the feeder link; t4=d4/c, and t4 represents the absolute time delay of the feeder link; d4_ref represents the reference distance of the feeder link; t4_ref=d4_ref/c, and t4_ref represents the reference time delay of the feeder link.

In one embodiment, the reference distance d4_ref or the reference time delay t4_ref of the feeder link is obtained by using one of three following methods:

first method: obtaining the actual location of a gateway station through broadcast signaling or other downlink signaling issued by a network side, and determining the reference distance d4_ref of the feeder link or the reference time delay t4_ref of the feeder link according to the actual location of the gateway station;

second method: obtaining the reference distance d4_ref of the feeder link or the reference time delay t4_ref of the feeder link through broadcast signaling or other downlink signaling issued by the network side;

third method: the reference distance d4_ref of the feeder link or the reference time delay t4_ref of the feeder link is predefined as a value associated with latitude, by a protocol.

In one embodiment, when the first method is used:
the minimum of absolute distances or absolute time delays of feeder links of multiple satellites associated with one gateway station is used as the reference distance d4_ref of the feeder link or the reference time delay t4_ref of the feeder link according to the actual location of the gateway station; or the reference distance d4_ref of the feeder link or the reference time delay t4_ref of the feeder link is determined through the actual location of the gateway station and ephemeris information of a target satellite.

In one embodiment, the processor 600 is specifically configured to:

calculate the total relative time delay compensation value T_total by the following formula:

$$T\_total = T3 + T4 + T\_offset$$

and T3 represents the relative time delay of the service link, T4 represents the relative time delay of the feeder link, and T_offset represents a preset offset;

perform the time delay compensation on a transmitting end signal based on the total relative time delay compensation value.

In one embodiment, the processor 600 is specifically configured to:

obtain a parameter T_ref_total notified by the network side, and T_ref_total=t3_ref+t4_ref-T_offset, t3_ref represents a reference time delay of the service link, t4_ref represents a reference time delay of the feeder link, and T_offset represents a preset offset;

determine the total relative time delay compensation value T_total by using T_ref_total, and T_total=t3+t4−T_ref_total;

perform the time delay compensation on a transmitting end signal based on the total relative time delay compensation value.

A transceiver 610 is configured to receive and send the data under the control of the processor 600.

Here, in FIG. 11, the bus architecture can include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the devices for communicating with various other devices over the transmission media. For different user equipment, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 can be Central Processing Unit (CPU), Application Specific Integrated Circuit (ASIC), Field-Programmable Gate Array (FPGA) or Complex Programmable Logic Device (CPLD).

Figure 12:
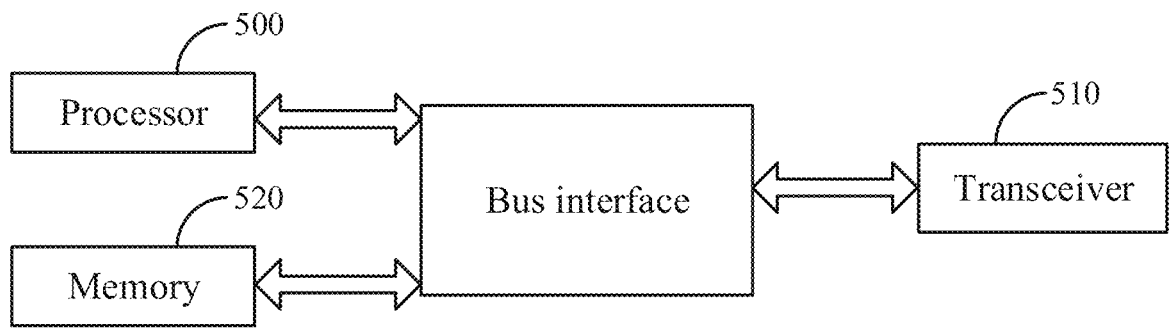
FIG. 12 shows a structural schematic diagram of a time delay compensation control apparatus at the network side according to embodiments of the present application.

On the network side, referring to FIG. 12, a time delay compensation control apparatus provided by embodiments of the present application includes:

a memory 520 configured to store program instructions;

a processor 500 configured to invoke the program instructions stored in the memory, and execute according to the obtained program:

determining control parameters for instructing a terminal to perform the time delay compensation based on a relative time delay of a service link and a relative time delay of a feeder link in a satellite communication system NTN;

notifying the terminal of the control parameters.

In one embodiment, the control parameters include a parameter for instructing the terminal to determine the relative time delay of the service link: a reference distance d3_ref or a reference time delay t3_ref of the service link;

the control parameters further include a parameter for instructing the terminal to determine the relative time delay of the feeder link: a reference distance d4_ref or a reference time delay t4_ref of the feeder link.

In one embodiment, the step of notifying the terminal of the parameter for instructing the terminal to determine the relative time delay of the service link specifically includes: issuing broadcast signaling or other downlink signaling so that the terminal obtains the reference distance d3_ref or the reference time delay t3_ref of the service link.

In one embodiment, the processor 500 is specifically configured to:

issue broadcast signaling or other downlink signaling to assist the terminal in obtaining the actual location of a gateway station, so that the terminal determines the reference distance d4_ref of the feeder link or the reference time delay t4_ref of the feeder link according to the actual location of the gateway station;

or issue broadcast signaling or other downlink signaling so that the terminal obtains the reference distance d4_ref of the feeder link or the reference time delay t4_ref of the feeder link.

In one embodiment, when the processor 500 notifies the reference distance d3_ref or reference time delay t3_ref of the service link through broadcast signaling or notifies the reference distance d4_ref of the feeder link or the reference time delay t4_ref of the feeder link through broadcast signaling, the processor 500 is further configured to notify a starting time from which the reference distance or reference time delay becomes effective.

In one embodiment, the control parameters further include a preset offset T_offset, so that the terminal determines the total relative time delay compensation value T_total based on the relative time delay of the service link, the relative time delay of the feeder link and the offset T_offset, and performs time delay compensation on a transmitting end signal based on T_total.

In one embodiment, the control parameters include T_ref_total, so that the terminal determines the total relative time delay compensation value T_total based on T_ref_total, the absolute time delay of the service link and the absolute time delay of the feeder link, and performs time delay compensation on a transmitting end signal based on T_total;

and T_ref_total=t3_ref+t4_ref-T_offset, t3_ref represents the reference time delay of the service link, t4_ref represents the reference time delay of the feeder link, T_offset represents a preset offset; and T_total=t3+t4−T_ref_total.

In one embodiment, the processor 500 is further configured to:

obtain the relative time delay of the service link and the relative time delay of the feeder link reported by the terminal.

A transceiver 510 is configured to receive and send the data under the control of the processor 500.

Here, in FIG. 12, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 13:
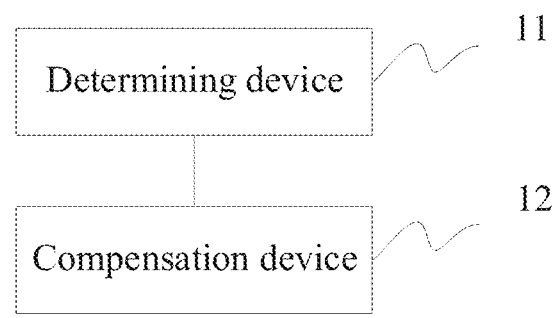
FIG. 13 shows a structural schematic diagram of another time delay compensation apparatus at the terminal side according to embodiments of the present application.

On the terminal side, referring to FIG. 13, another time delay compensation apparatus provided by embodiments of the present application includes:

a determining device 11 configured to determine that the time delay compensation needs to be performed on a service link and a feeder link in a satellite communication system NTN;

a compensation device 12 configured to perform the time delay compensation based on a relative time delay of the service link and a relative time delay of the feeder link.

In one embodiment, the determining device 11 is further configured to report the relative time delay of the service link and the relative time delay of the feeder link to the network side.

In one embodiment, the relative time delay of the service link is determined according to a reference distance or a reference time delay of the service link.

In one embodiment, the relative time delay of the service link is determined by the following formula:

$$T3=(d3-d3\_\text{ref})/c=t3-t3\_\text{ref}$$

and T3 represents the relative time delay of the service link; c represents the speed of light; d3 represents the absolute distance of the service link; $t3=d3/c$, and t3 represents the absolute time delay of the service link; $d3\_\textit{ref}$ represents the reference distance of the service link; $t3\_\textit{ref}=d3\_\textit{ref}/c$, and $t3\_\textit{ref}$ represents the reference time delay of the service link.

In one embodiment, the reference distance $d3\_\textit{ref}$ or the reference time delay $t3\_\textit{ref}$ of the service link is obtained by using one of four following methods:

first method: the reference distance $d3\_\textit{ref}$ or the reference time delay $t3\_\textit{ref}$ of the service link is predefined as a fixed value, by a protocol;

second method: obtaining the reference distance $d3\_\textit{ref}$ or the reference time delay $t3\_\textit{ref}$ of the service link through broadcast signaling or other downlink signaling issued by the network side;

third method: the reference distance $d3\_\textit{ref}$ or the reference time delay $t3\_\textit{ref}$ of the service link is predefined as a value associated with latitude, by a protocol;

fourth method: obtaining the reference distance $d3\_\textit{ref}$ or the reference time delay $t3\_\textit{ref}$ of the service link according to the ephemeris information, and the ephemeris information contains the information used by the terminal to determine the precise location of a satellite.

In one embodiment, when the second method is used, the reference distance $d3\_\textit{ref}$ is a shortest distance from the satellite to a ground cell, or the reference distance $d3\_\textit{ref}$ is the shortest distance from the satellite to the ground cell minus a distance offset value related to height, or the reference time delay $t3\_\textit{ref}$ is a shortest time delay for the satellite to reach the ground cell, or the reference time delay $t3\_\textit{ref}$ is the shortest time delay for the satellite to reach the ground cell minus a time delay offset value related to height.

In one embodiment, when the fourth method is used, a shortest distance from the satellite to a ground cell where the terminal is located is obtained according to the ephemeris information, and the shortest distance is used as the reference distance $d3\_\textit{ref}$; or a shortest time delay for the satellite to reach the ground cell where the terminal is located is obtained according to the ephemeris information, and the shortest time delay is used as the reference time delay $t3\_\textit{ref}$.

In one embodiment, the relative time delay of the feeder link is determined according to a reference distance or a reference time delay of the feeder link.

In one embodiment, the relative time delay of the feeder link is determined by the following formula:

$$T4=(d4-d4\_\text{ref})/c=t4-t4\_\text{ref}$$

and T4 represents the relative time delay of the feeder link; c represents the speed of light; d4 represents the absolute distance of the feeder link; $t4=d4/c$, and t4 represents the absolute time delay of the feeder link; $d4\_\textit{ref}$ represents the reference distance of the feeder link; $t4\_\textit{ref}=d4\_\textit{ref}/c$, and $t4\_\textit{ref}$ represents the reference time delay of the feeder link.

In one embodiment, the reference distance $d4\_\textit{ref}$ or the reference time delay $t4\_\textit{ref}$ of the feeder link is obtained by using one of three following methods:

first method: obtaining the actual location of a gateway station through broadcast signaling or other downlink signaling issued by a network side, and determining the reference distance $d4\_\textit{ref}$ of the feeder link or the reference time delay $t4\_\textit{ref}$ of the feeder link according to the actual location of the gateway station;

second method: obtaining the reference distance $d4\_\textit{ref}$ of the feeder link or the reference time delay $t4\_\textit{ref}$ of the feeder link through broadcast signaling or other downlink signaling issued by the network side;

third method: the reference distance $d4\_\textit{ref}$ of the feeder link or the reference time delay $t4\_\textit{ref}$ of the feeder link is predefined as a value associated with latitude, by a protocol.

In one embodiment, when the first method is used for obtaining the reference distance $d4\_\textit{ref}$ or the reference time delay $t4\_\textit{ref}$ of the feeder link:

the minimum of absolute distances or absolute time delays of feeder links of multiple satellites associated with one gateway station is used as the reference distance $d4\_\textit{ref}$ of the feeder link or the reference time delay $t4\_\textit{ref}$ of the feeder link according to the actual location of the gateway station; or the reference distance $d4\_\textit{ref}$ of the feeder link or the reference time delay $t4\_\textit{ref}$ of the feeder link is determined through the actual location of the gateway station and ephemeris information of a target satellite.

In one embodiment, the compensation device 12 is specifically configured to:

calculate the total relative time delay compensation value T_total by the following formula:

$$T\_\text{total}=T3+T4+T\_\text{offset}$$

and T3 represents the relative time delay of the service link, T4 represents the relative time delay of the feeder link, and T_offset represents a preset offset;

perform the time delay compensation on a transmitting end signal based on the total relative time delay compensation value.

In one embodiment, the compensation device 12 is specifically configured to:

obtain a parameter T_ref_total notified by the network side, and T_ref_total=t3_ref+t4_ref-T_offset, t3_ref represents a reference time delay of the service link, t4_ref represents a reference time delay of the feeder link, and T_offset represents a preset offset;

determine the total relative time delay compensation value T_total by using T_ref_total, and T_total=t3+t4-T_ref_total;

perform the time delay compensation on a transmitting end signal based on the total relative time delay compensation value.

Figure 14:
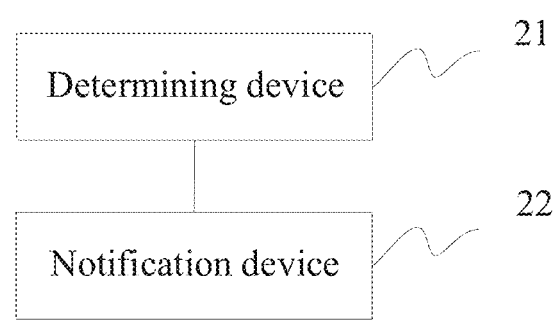
FIG. 14 shows a structural schematic diagram of another time delay compensation control apparatus at the network side according to embodiments of the present application.

On the network side, referring to FIG. 14, another time delay compensation control apparatus provided by embodiments of the present application includes:

a determining device 21 configured to determine control parameters for instructing a terminal to perform the time delay compensation based on a relative time delay of a service link and a relative time delay of a feeder link in a satellite communication system NTN;

a notification device 22 configured to notify the terminal of the control parameters.

In one embodiment, the control parameters include a parameter for instructing the terminal to determine the relative time delay of the service link: a reference distance d3_ref or a reference time delay t3_ref of the service link;

the control parameters further include a parameter for instructing the terminal to determine the relative time delay of the feeder link: a reference distance d4_ref or a reference time delay t4_ref of the feeder link.

In one embodiment, the step of notifying the terminal of the parameter for instructing the terminal to determine the relative time delay of the service link specifically includes: issuing broadcast signaling or other downlink signaling so that the terminal obtains the reference distance d3_ref or the reference time delay t3_ref of the service link.

In one embodiment, the determining device 21 is specifically configured to:

issue broadcast signaling or other downlink signaling to assist the terminal in obtaining the actual location of a gateway station, so that the terminal determines the reference distance d4_ref of the feeder link or the reference time delay t4_ref of the feeder link according to the actual location of the gateway station;

or issue broadcast signaling or other downlink signaling so that the terminal obtains the reference distance d4_ref of the feeder link or the reference time delay t4_ref of the feeder link.

In one embodiment, when the processor notifies the reference distance d3_ref or reference time delay t3_ref of the service link through broadcast signaling or notifies the reference distance d4_ref of the feeder link or the reference time delay t4_ref of the feeder link through broadcast signaling, the processor is further configured to notify a starting time from which the reference distance or reference time delay becomes effective.

In one embodiment, the control parameters further include a preset offset T_offset, so that the terminal determines the total relative time delay compensation value T_total based on the relative time delay of the service link, the relative time delay of the feeder link and the offset T_offset, and performs time delay compensation on a transmitting end signal based on T_total.

In one embodiment, the control parameters include T_ref_total, so that the terminal determines the total relative time delay compensation value T_total based on T_ref_total, the absolute time delay of the service link and the absolute time delay of the feeder link, and performs time delay compensation on a transmitting end signal based on T_total;

and T_ref_total=t3_ref+t4_ref-T_offset, t3_ref represents the reference time delay of the service link, t4_ref represents the reference time delay of the feeder link, T_offset represents a preset offset; and T_total=t3+t4-T_ref_total.

In one embodiment, the determining device 21 is further configured to:

obtain the relative time delay of the service link and the relative time delay of the feeder link reported by the terminal.

It should be noted that the division of devices in the embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

When the integrated device is implemented in the form of software functional device and sold or used as an independent product, it may be stored in a computer readable storage medium. Based on such understanding, the embodiments of the present application essentially or a part that contributes to the prior art or all or a part of the solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

Embodiments of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In embodiments of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

Embodiments of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network side, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

The invention claimed is:

1. A time delay compensation method applied to a terminal, comprising:
    determining that time delay compensation needs to be performed on a service link and a feeder link in a satellite communication system Non-Terrestrial Network, NTN;
    performing the time delay compensation based on a relative time delay of the service link and a relative time delay of the feeder link;
    wherein the relative time delay of the service link is determined according to a reference distance or a reference time delay of the service link;
    wherein the relative time delay of the service link is determined by a following formula:

$$T3=(d3-d3\_ref)/c=t3-t3\_ref$$

wherein T3 represents the relative time delay of the service link, c represents a speed of light, d3 represents an absolute distance of the service link, t3=d3/c, and t3 represents an absolute time delay of the service link; and
    d3_*ref* represents the reference distance of the service link, t3_ref=d3_ref/c, and t3_*ref* represents the reference time delay of the service link.

2. The method according to claim 1, further comprising: reporting the relative time delay of the service link and the relative time delay of the feeder link to a network side.

3. The method according to claim 1, wherein the reference distance d3_*ref* or the reference time delay t3_*ref* of the service link is obtained by using one of four following methods:
    first method: the reference distance d3_*ref* or the reference time delay t3_*ref* of the service link is predefined as a fixed value, by a protocol;
    second method: obtaining the reference distance d3_*ref* or the reference time delay t3_*ref* of the service link through broadcast signaling or other downlink signaling sent from the network side;
    third method: the reference distance d3_*ref* or the reference time delay t3_*ref* of the service link is predefined as a value associated with latitude, by a protocol;
    fourth method: obtaining the reference distance d3_*ref* or the reference time delay t3_*ref* of the service link according to ephemeris information, wherein the ephemeris information contains information used by the terminal to determine a precise location of a satellite.

4. The method according to claim 3, wherein when the second method is used, the reference distance d3_*ref* is a shortest distance from the satellite to a ground cell, or the reference distance d3_ref is the shortest distance from the satellite to the ground cell minus a distance offset related to height, or the reference time delay t3_ref is a shortest time delay for the satellite to reach the ground cell, or the reference time delay t3_ref is the shortest time delay for the satellite to reach the ground cell minus a time delay offset related to height.

5. The method according to claim 3, wherein when the fourth method is used, a shortest distance from the satellite to a ground cell where the terminal is located is obtained according to the ephemeris information, and the shortest distance is used as the reference distance d3_ref; or a shortest time delay for the satellite to reach the ground cell where the terminal is located is obtained according to the ephemeris information, and the shortest time delay is used as the reference time delay t3_ref.

6. The method according to claim 1, wherein the relative time delay of the feeder link is determined according to a reference distance or a reference time delay of the feeder link.

7. The method according to claim 6, wherein the relative time delay of the feeder link is determined by a following formula:

$$T4=(d4-d4\_ref)/c=t4-t4\_ref$$

wherein T4 represents the relative time delay of the feeder link; c represents a speed of light; d4 represents an absolute distance of the feeder link; t4=d4/c, and t4 represents an absolute time delay of the feeder link; d4_ref represents the reference distance of the feeder link; t4_ref=d4_ref/c, and t4_ref represents the reference time delay of the feeder link.

8. The method according to claim 7, wherein the reference distance d4_ref or the reference time delay t4_ref of the feeder link is obtained by using one of three following methods:
   first method: obtaining an actual location of a gateway station through broadcast signaling or other downlink signaling sent from a network side, and determining the reference distance d4_ref of the feeder link or the reference time delay t4_ref of the feeder link according to the actual location of the gateway station;
   second method: obtaining the reference distance d4_ref of the feeder link or the reference time delay t4_ref of the feeder link through broadcast signaling or other downlink signaling sent from the network side;
   third method: the reference distance d4_ref of the feeder link or the reference time delay t4_ref of the feeder link is predefined as a value associated with latitude, by a protocol.

9. The method according to claim 8, wherein when the first method is used:
   a minimum of absolute distances for feeder links of multiple satellites associated with the gateway station is used as the reference distance d4_ref of the feeder link according to the actual location of the gateway station; or a minimum of absolute time delays for feeder links of multiple satellites associated with the gateway station is used as the reference time delay t4_ref of the feeder link according to the actual location of the gateway station;
   or
   the reference distance d4_ref of the feeder link or the reference time delay t4_ref of the feeder link is determined through the actual location of the gateway station and ephemeris information of a target satellite.

10. The method according to claim 1, wherein the performing the time delay compensation based on a relative time delay of the service link and a relative time delay of the feeder link, comprises:
    calculating a total relative time delay compensation value T_total by a following formula:

$$T\_total=T3+T4+T\_offset$$

wherein T3 represents the relative time delay of the service link, T4 represents the relative time delay of the feeder link, and T_offset represents a preset offset;
    performing the time delay compensation on a transmitting end signal based on the total relative time delay compensation value.

11. The method according to claim 1, wherein the performing the time delay compensation based on a relative time delay of the service link and a relative time delay of the feeder link, comprises:
    obtaining a parameter T_ref_total notified by a network side, wherein T_ref_total=t3_ref+t4_ref-T_offset, t3_ref represents a reference time delay of the service link, t4_ref represents a reference time delay of the feeder link, and T_offset represents a preset offset;
    determining a total relative time delay compensation value T_total by using T_ref_total, wherein T_total=t3+t4-T_ref_total;
    performing time delay compensation on a transmitting end signal based on the total relative time delay compensation value.

12. A time delay compensation control method applied to a network side, comprising:
    determining control parameters for instructing a terminal to perform time delay compensation based on a relative time delay of a service link and a relative time delay of a feeder link in a satellite communication system Non-Terrestrial Network, NTN;
    notifying the terminal of the control parameters;
    wherein the control parameters comprise a parameter for instructing the terminal to determine the relative time delay of the service link: a reference distance d3_ref or a reference time delay t3_ref of the service link;
    the control parameters further comprise a parameter for instructing the terminal to determine the relative time delay of the feeder link: a reference distance d4_ref or a reference time delay t4_ref of the feeder link.

13. The method according to claim 12, wherein the control parameters comprise T_ref_total, to allow the terminal to determine a total relative time delay compensation value T_total based on T_ref_total, an absolute time delay of the service link and an absolute time delay of the feeder link, and perform time delay compensation on a transmitting end signal based on T_total;
    wherein T_ref_total=t3_ref+t4_ref-T_offset, t3_ref represents the reference time delay of the service link, t4_ref represents the reference time delay of the feeder link, T_offset represents a preset offset; and T_total=t3+t4-T_ref_total.

14. The method according to claim 12, further comprising:
    obtaining the relative time delay of the service link and the relative time delay of the feeder link reported by the terminal.

15. A time delay compensation apparatus, comprising:
    a memory configured to store program instructions;
    a processor configured to invoke the program instructions stored in the memory, and execute according to an obtained program:

determining that time delay compensation needs to be performed on a service link and a feeder link in a satellite communication system Non-Terrestrial Network, NTN;

performing the time delay compensation based on a relative time delay of the service link and a relative time delay of the feeder link;

wherein the relative time delay of the service link is determined according to a reference distance or a reference time delay of the service link;

wherein the relative time delay of the service link is determined by a following formula:

$$T3=(d3-d3\_ref)/c=t3-t3\_ref$$

wherein T3 represents the relative time delay of the service link, c represents a speed of light, d3 represents an absolute distance of the service link, t3=d3/c, and t3 represents an absolute time delay of the service link; and d3 ref represents the reference distance of the service link, t3_ref=d3_ref/c, and t3_*ref* represents the reference time delay of the service link.

16. A time delay compensation control apparatus, comprising:

a memory configured to store program instructions;

a processor configured to invoke the program instructions stored in the memory, and execute the method of claim 12 according to the program instructions.

17. A non-transitory computer storage medium, wherein the computer storage medium stores computer executable instructions which are configured to cause the computer to perform the method of claim 1.

* * * * *